Figure 1:
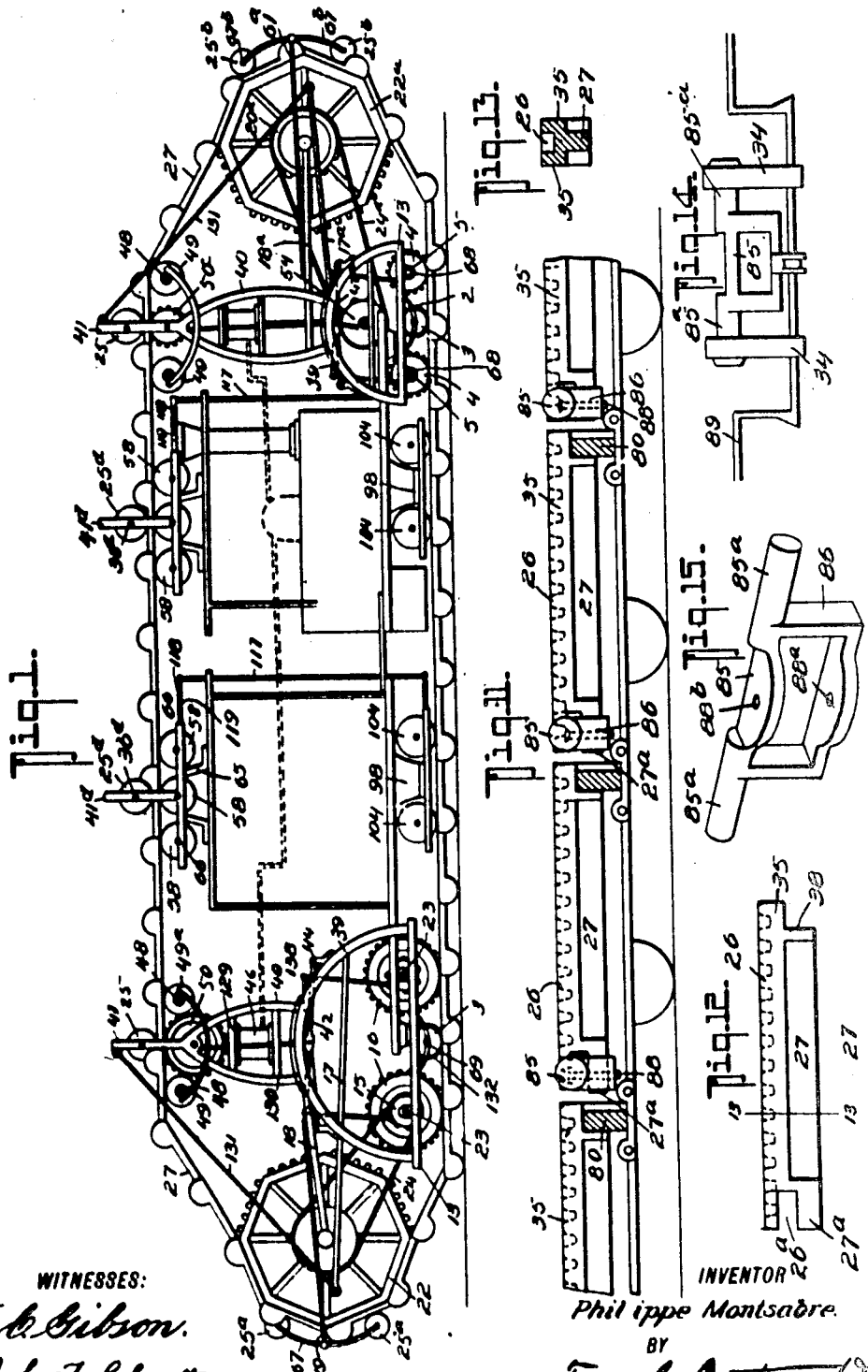

No. 865,605. PATENTED SEPT. 10, 1907.
P. MONTSABRE.
RACK TRACTION ENGINE.
APPLICATION FILED NOV. 17, 1905.

14 SHEETS—SHEET 1.

WITNESSES:
F. C. Gibson.
John T. Schrott.

INVENTOR
Philippe Montsabre.
BY
Fred G. Dieterich
ATTORNEYS

No. 865,605. PATENTED SEPT. 10, 1907.
P. MONTSABRE.
RACK TRACTION ENGINE.
APPLICATION FILED NOV. 17, 1905.

14 SHEETS—SHEET 2.

Fig. 2.

WITNESSES:
F. C. Gibson
John T. Schrott

INVENTOR
Philippe Montsabre.
BY
Fred G. Dieterich
ATTORNEYS

No. 865,605. PATENTED SEPT. 10, 1907.
P. MONTSABRE.
RACK TRACTION ENGINE.
APPLICATION FILED NOV. 17, 1905.
14 SHEETS—SHEET 3.

WITNESSES:
F. C. Gibson.
John T. Schrott.

INVENTOR
Philippe Montsabre.
BY
Fred G. Dieterich
ATTORNEYS

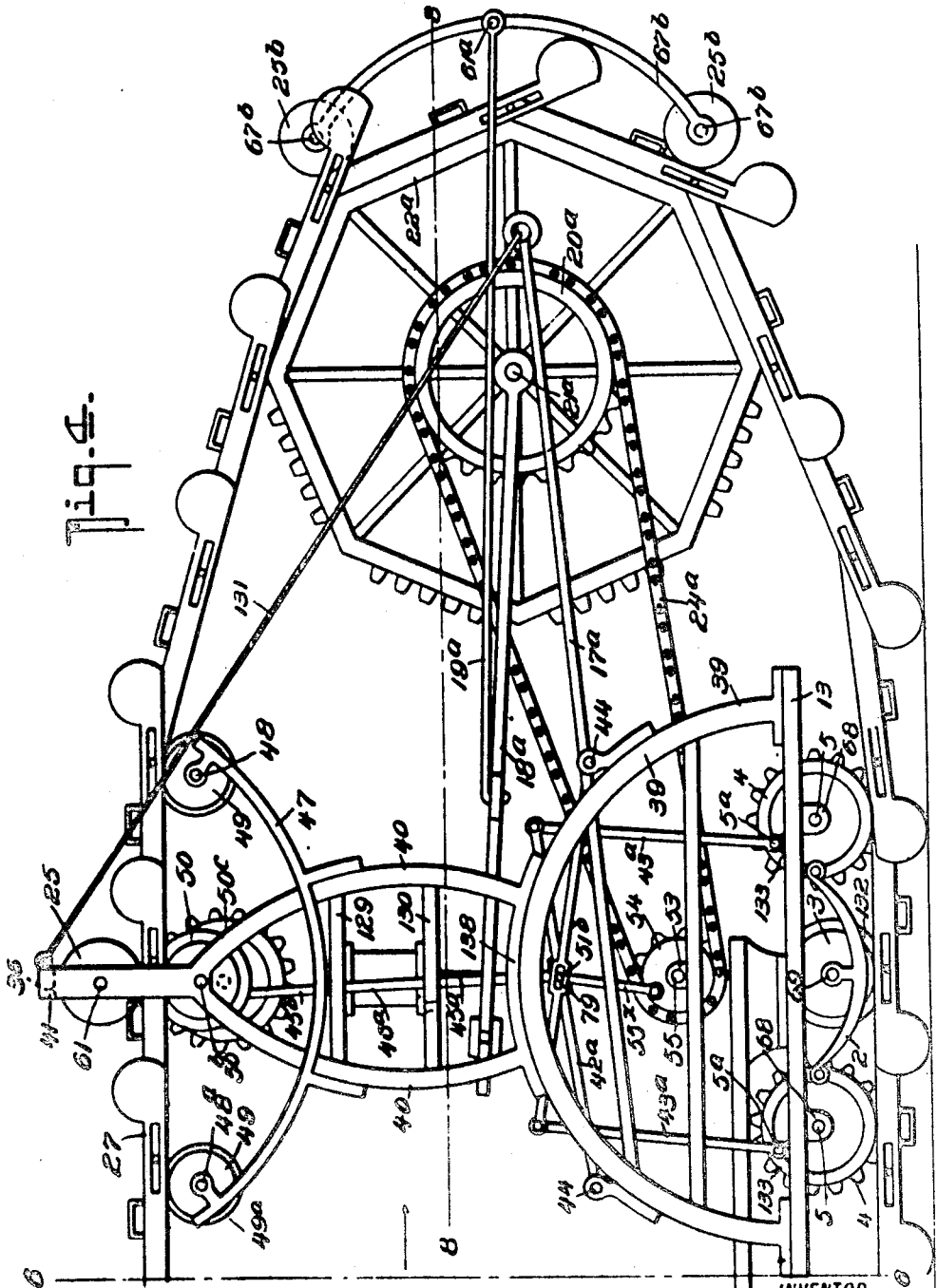

No. 865,605. PATENTED SEPT. 10, 1907.
P. MONTSABRE.
RACK TRACTION ENGINE.
APPLICATION FILED NOV. 17, 1905.
14 SHEETS—SHEET 5.
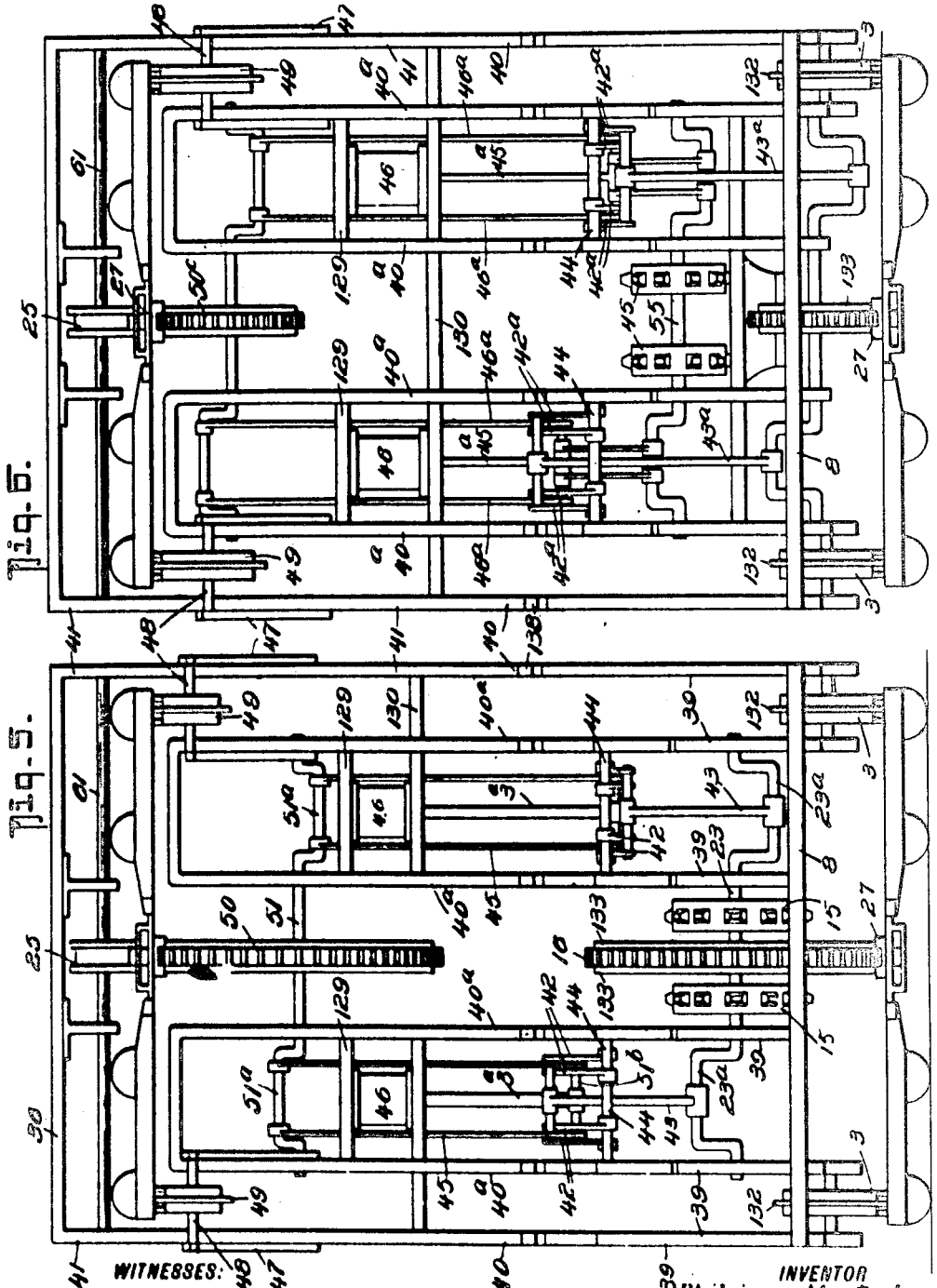

No. 865,605. PATENTED SEPT. 10, 1907.
P. MONTSABRE.
RACK TRACTION ENGINE.
APPLICATION FILED NOV. 17, 1905.

14 SHEETS—SHEET 6.

Fig. 7.

WITNESSES:
F. L. Gibson.
John T. Schrott.

INVENTOR
Philippe Montsabre.

BY
Fred G. Dieterich
ATTORNEYS

No. 865,605.

PATENTED SEPT. 10, 1907.

P. MONTSABRE.
RACK TRACTION ENGINE.
APPLICATION FILED NOV. 17, 1905.

14 SHEETS—SHEET 7.

WITNESSES:
T. C. Gibson.
John T. Schrott.

INVENTOR
Philippe Montsabre.
BY
Fred G. Dieterich
ATTORNEYS

No. 865,605. PATENTED SEPT. 10, 1907.
P. MONTSABRE.
RACK TRACTION ENGINE.
APPLICATION FILED NOV. 17, 1905.

14 SHEETS—SHEET 8.

WITNESSES:
F. A. Gibson.
John T. Schrott

INVENTOR
Philippe Montsabre.
BY
Fred G. Dieterich
ATTORNEYS

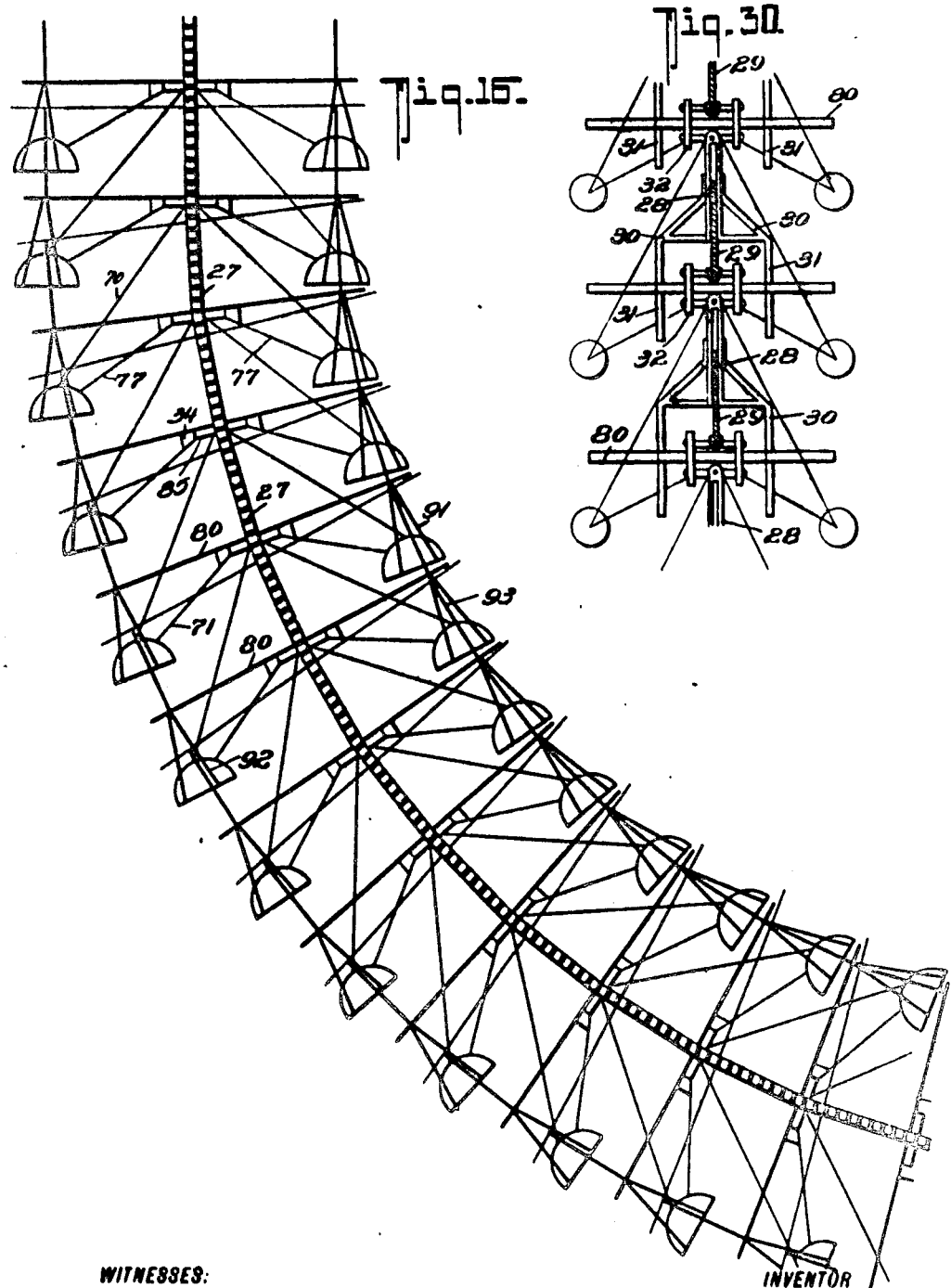

No. 865,605.                                    PATENTED SEPT. 10, 1907.
P. MONTSABRE.
RACK TRACTION ENGINE.
APPLICATION FILED NOV. 17, 1905.

14 SHEETS—SHEET 10.

WITNESSES:                              INVENTOR
                                    Philippe Montsabre.
                                        BY
                                        ATTORNEYS

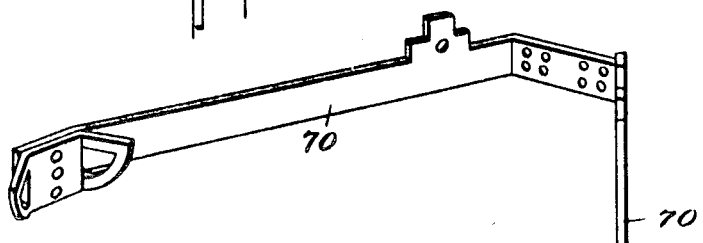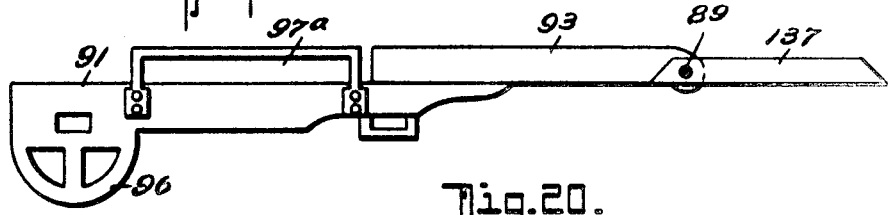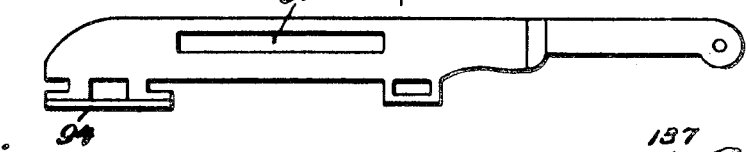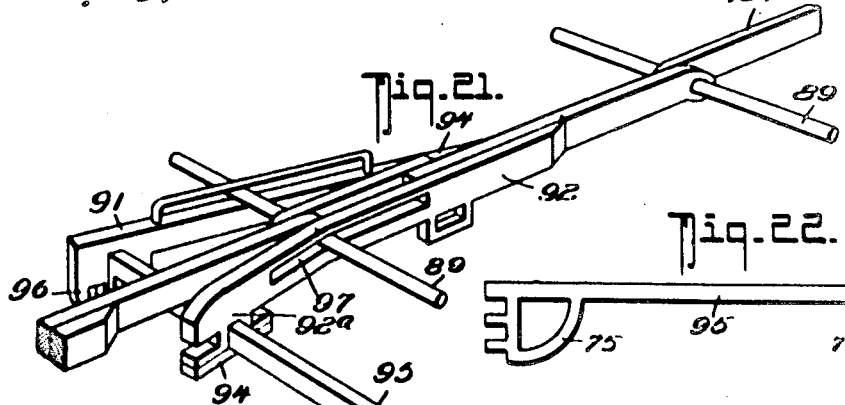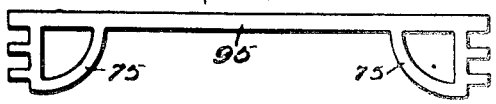

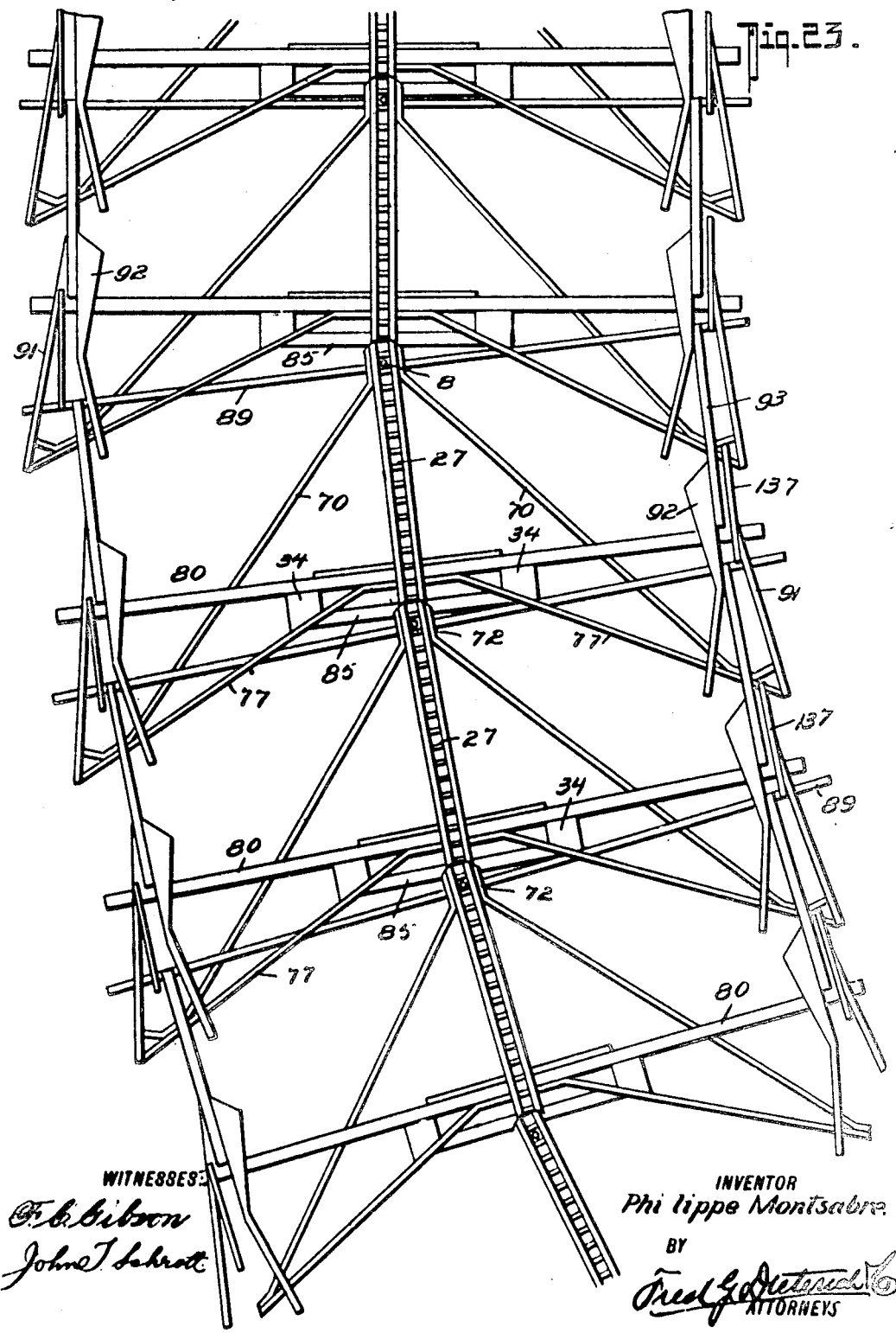

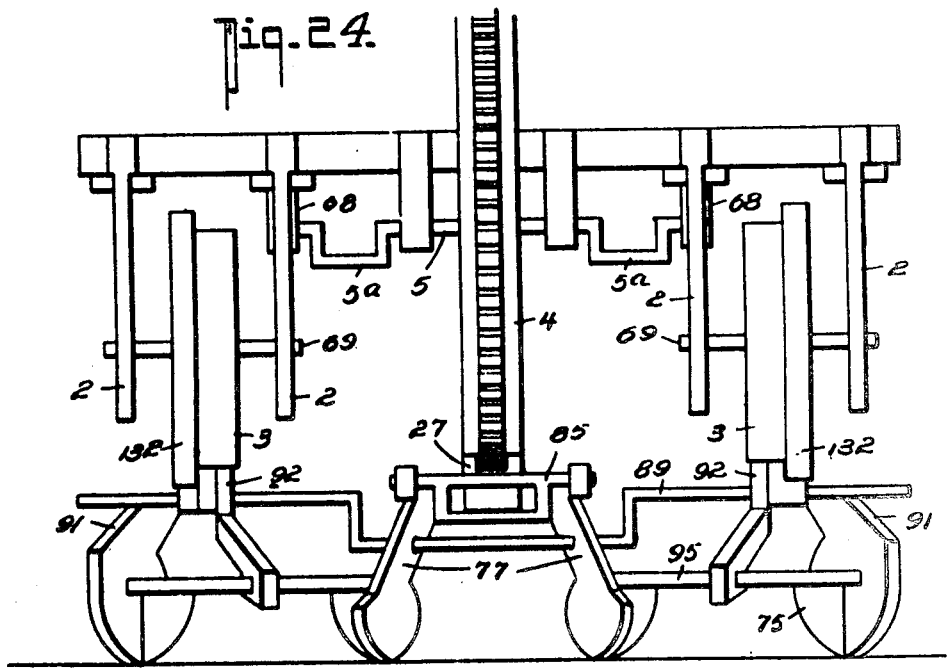

No. 865,605.  
P. MONTSABRE.  
RACK TRACTION ENGINE.  
APPLICATION FILED NOV. 17, 1905.

PATENTED SEPT. 10, 1907.

14 SHEETS—SHEET 14.

WITNESSES:  
F. C. Gibson.  
John T. Schrott.

INVENTOR  
Philippe Montsabre.  
BY  
Fred G. Dieterich  
ATTORNEYS

UNITED STATES PATENT OFFICE.

PHILIPPE MONTSABRE, OF FRESNO, CALIFORNIA.

RACK TRACTION-ENGINE.

No. 865,605.　　　　　Specification of Letters Patent.　　　　Patented Sept. 10, 1907.

Application filed November 17, 1905. Serial No. 287,908.

*To all whom it may concern:*

Be it known that I, PHILIPPE MONTSABRE, residing at Fresno, in the county of Fresno and State of California, have invented a new and Improved Combined Traction-Engine and Track Laying and Conveying Mechanism Therefor, of which the following is a specification.

My invention relates particularly to an improvement in that type of traction engines in which an endless chain of track sections is provided, having feet or traveling members for contacting with the ground, guide rails forming a coöperative part of the track mechanism, and propelling means including car trucks for sustaining the power mechanism, the said car trucks and propelling mechanisms being coöperatively combined with the endless track and guide mechanisms, the several parts having special correlation whereby, as the engine moves forward, the track will be continuously laid therefor and at the same time be picked up and carried along so that the various parts constituting my invention operate as a complete mechanism, all of which travels forward as power is applied.

Primarily, my invention seeks to provide an improved mechanism of the character stated, in which the parts are particularly designed for great flexibility and whereby the laying and picking up of the track and guide way is easily and effectively accomplished and whereby, the co-acting rail and guide means can be quickly deflected laterally in the directions desired without undue strain upon the operating parts.

My invention generally comprehends an endless track and guide-way, a car mounted to travel thereon and therewith, and adjusted to sustain the driving power, a front or pilot truck having drive mechanisms arranged to be actuated from the driving power on the car and including means for positively laying the track, a rear traction truck which includes a drive mechanism also actuated from the power mechanism, mounted on the car and which includes a traction wheel for picking up the track and guiding it toward its forward direction, the said car and the front and rear traction trucks having means for joining together in a longitudinal plane and for individual flexure laterally relatively to each other.

My invention also comprehends, in connection with the mechanism for laying and imparting a continuous motion to the endless track way, means carried by the front and rear trucks and the intermediate car for properly guiding the track-way and admitting of lateral flexure of the said guide-way to suit the curvature or lateral direction of movement of the parts, said front and rear trucks and the intermediate car being also equipped with special means for properly sustaining the upper or over-hanging portion of the track-way in engagement with a supplemental feed mechanism.

In its more complete nature, my invention comprehends a special construction of a track-way formed of flexible and joined sections, means for guiding same and for holding the several sections in proper longitudinal or curved alinement and means for sustaining each of the travelers or foot members whereby each traveler or foot member has movement independent of the others, whereby said foot member can adapt itself to the character of the ground and the desired direction of movement of the entire mechanism.

In its more subordinate features, my invention embodies certain structural combinations and novel arrangement of parts, all of which will be hereinafter specifically referred to, particularly in the accompanying drawings, in which:—

Figure 3:
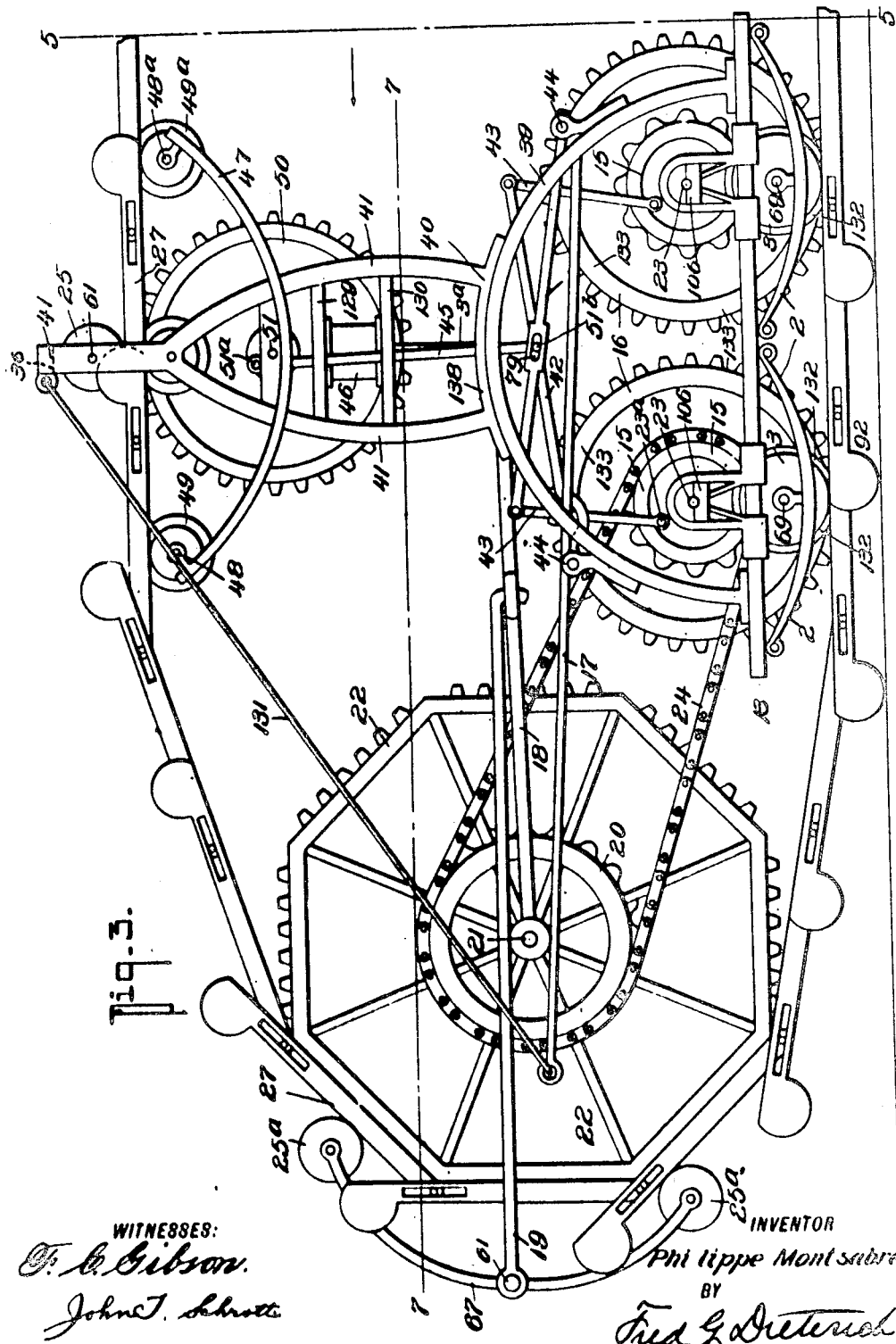
Figure 8:
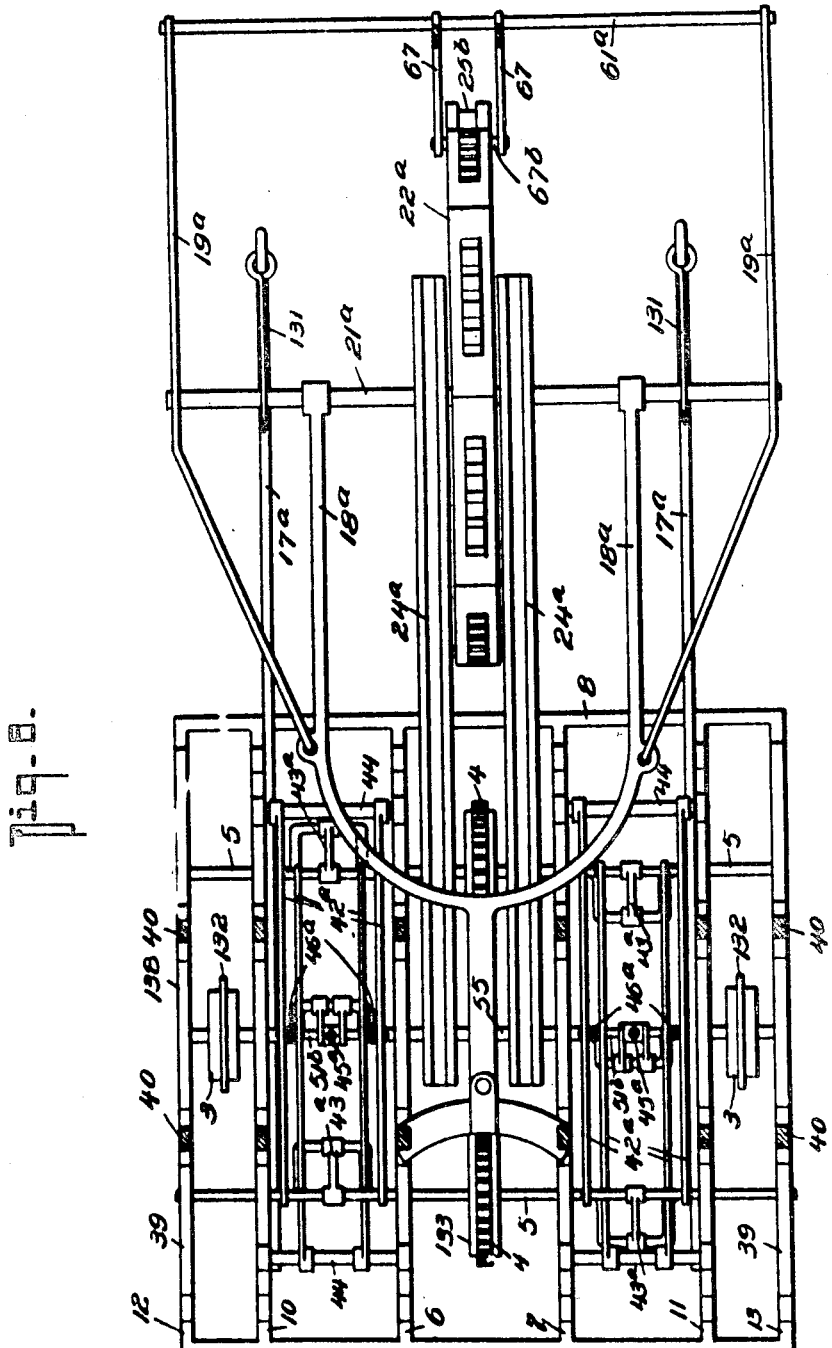
Figure 9:
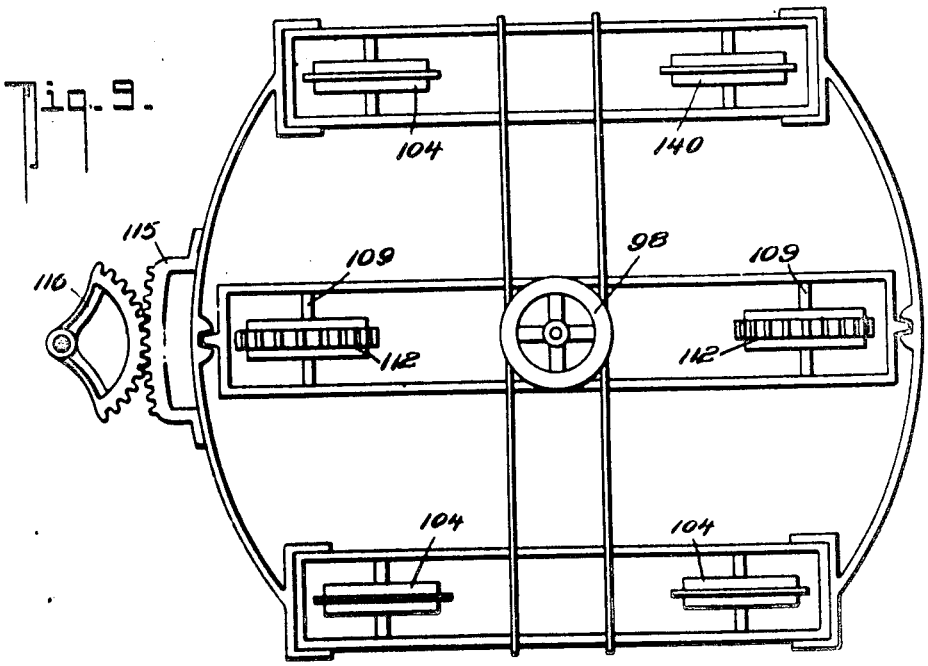
Figure 10:
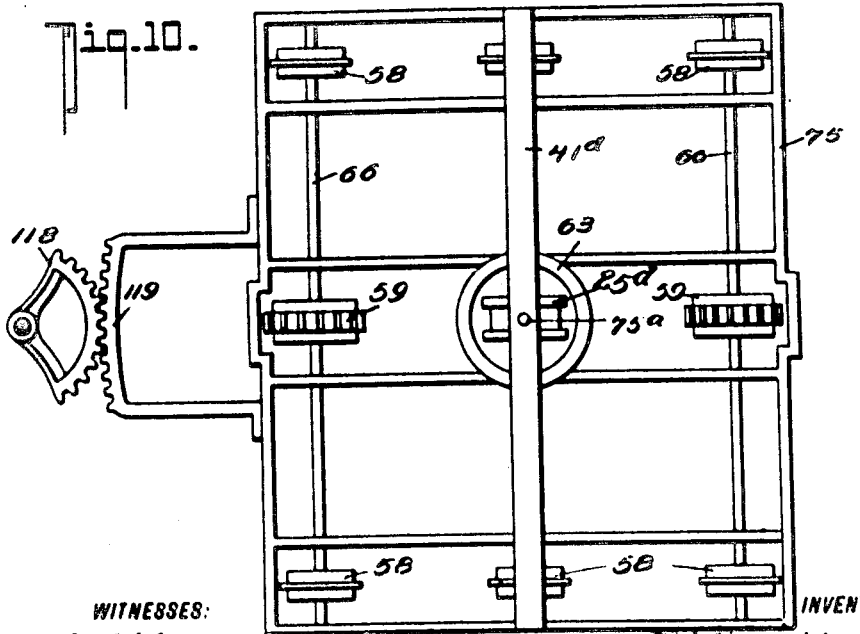
Figure 17:
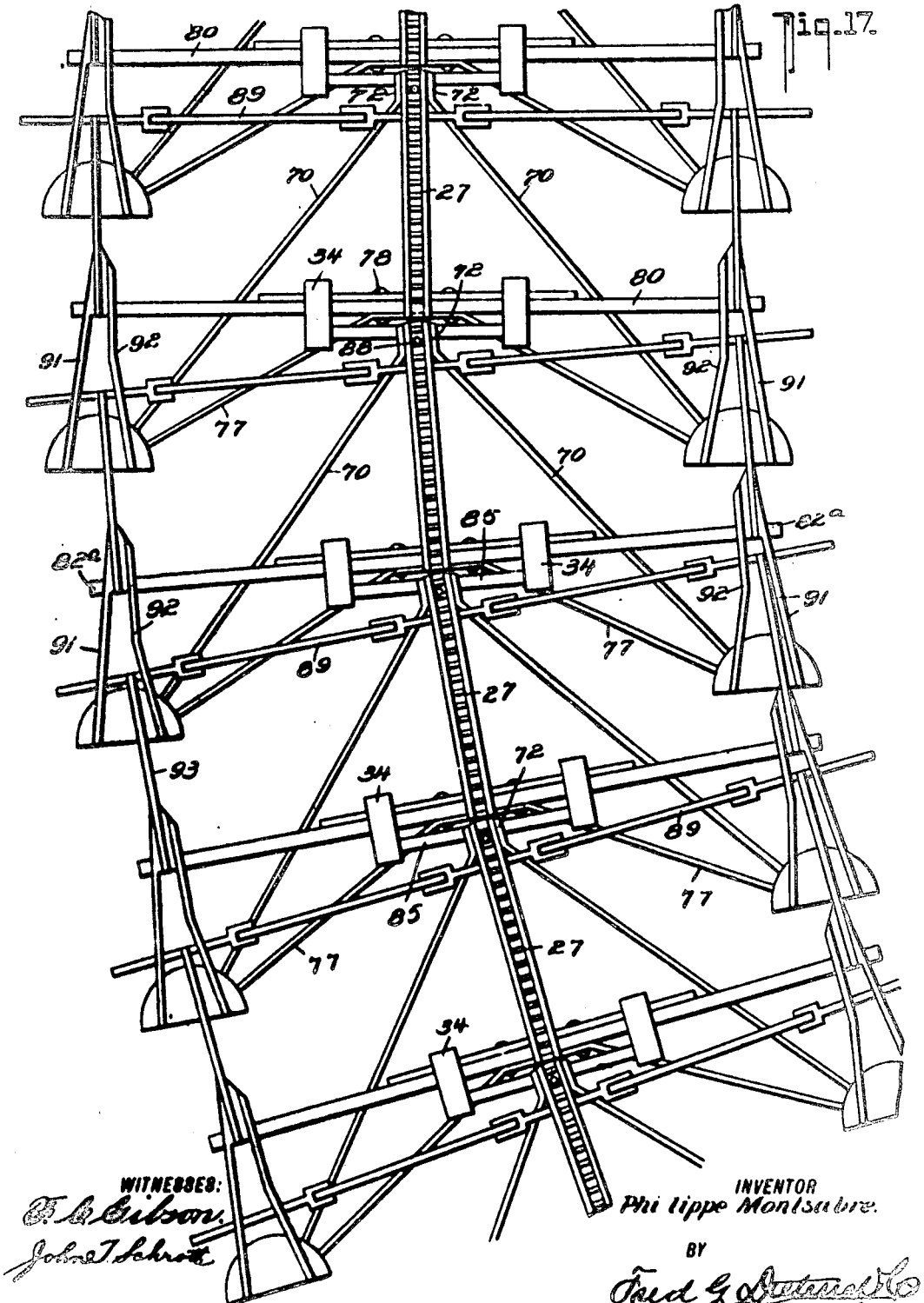
Figure 28:
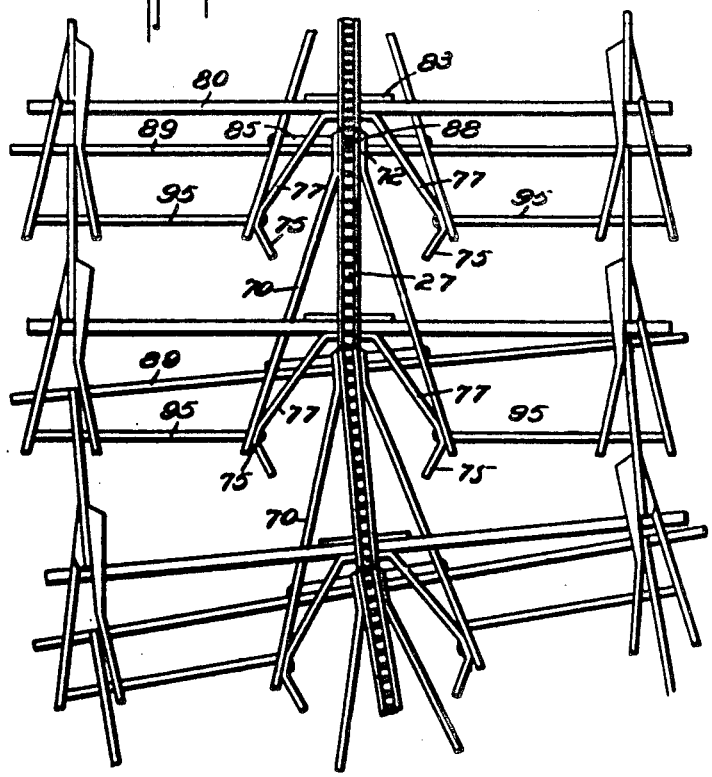
Figure 29:
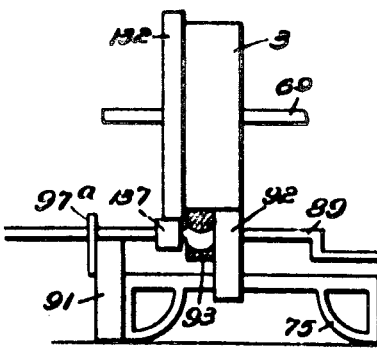

Figure 1, represents somewhat diagrammatically, a side elevation of my complete traction engine. Fig. 2, is a side elevation of a central truck, a box car mounted thereon and the over-head supports for the track-way mounted on the box car. Fig. 3, is a side elevation of the front or pilot traction truck and the track laying and supporting mechanism, the truck driving means and the over-head supports for the endless truck. Fig. 4, is a similar view of the rear traction truck, the rear or lift wheel, the driving mechanism for the several parts and the over-head supports for the endless flexible track. Fig. 5, is a transverse section taken substantially on the line 5—5 on Fig. 3. Fig. 6, is a similar view on the line 6—6 on Fig. 4, looking in the direction of the arrow. Fig. 7, is a horizontal section on the line 7—7 on Fig. 3 of the front or pilot traction end of the machine. Fig. 8, is a similar view of the rear traction end of the machine, on the line 8—8 of Fig. 4. Fig. 9, is a diagrammatic horizontal section, taken on the line 9—9 on Fig. 2. Fig. 10, is a top plan view of the oscillating frame on the box car that supports the over-head portion of the endless track-way, the latter being indicated in dotted lines. Fig. 11, is a detail view of a portion of the sectional track-way. Fig. 12, is a detail view of a portion of one of the rack members of the track-way. Fig. 13, is a cross section thereof on the line 13—13 on Fig. 12. Fig. 14, illustrates the construction of the pivot holding or bearings and the transverse or joiner rod hereinafter referred to. Fig. 15, is a detail perspective view of the rack pivot holder. Fig. 16, is a diagrammatic plan view which illustrates a portion of the track-way arranged with the several sections adjusted to form a curve. Fig. 17, is a plan view of a number of sections of the central track, the outer guides and foot or traveling member connections. Fig. 18, is a perspective view of the biforked bar 77, hereinafter referred to. Fig. 19, is a detail view of the outside branch member 91 of one of the Y-shaped tread rail links. Fig. 20, is a similar view of the inside branch 92 of one of the Y-shaped tread rail links. Fig. 21, is a perspective view of a complete Y-shaped tread rail link with a portion of the bridge member 137 connected thereto. Fig. 22, is a detail view of the bar 95 having the traction feet 75. Fig. 23, is a plan view of a modified form of the triple rail track which also shows the arrangement of the bridge member 137 over the Y side tread rail links. Fig. 24, is a detail transverse view, illustrating the track with a traction truck mounted thereon. Fig. 25, is a detail view of one of the members 80. Fig. 26, is a detail plan view of a modified structure hereinafter referred to. Fig. 27, is a detail view of one of the members 70. Figs. 28 and 29 are detail views of another modification, hereinafter referred to. Fig. 30, is a detail view of a further modification hereinafter referred to.

To render the detailed description of my invention the more readily understood, a brief reference to the general arrangement of my complete mechanism is here deemed proper.

In the general construction, my invention comprises a series of central track sections in the nature of racks that are pivotally and flexibly joined with each other whereby they will readily bend or otherwise adjust themselves to be engaged by and remain in connection with the traction power mechanism. Each track section is joined with a framing that projects laterally from each side of the rack or central portion and each of the lateral portions has at its outer end the traction or supporting feet of the endless traveling track or chain of track members, and each of the said lateral extensions further have their extremities suitably formed whereby to flexibly and pivotally join with each other and to provide outer guide rails to receive the outer supporting and guide wheels of the several trucks that form a part of the traction power mechanisms and the trailer car or cars.

The traction mechanism proper, the general arrangement of which and its coöperative connection with the endless chain or track sections that pass over and under the traction mechanism, is shown in Fig. 1, and the said traction mechanism includes what I shall hereinafter term the front or pilot traction portion, since the said front end pilots the direction of the entire machine and also serves as a means for laying the track, a rear traction portion, since the rear end of the complete machine acts to guide the endless chain of tracks, and to lift the same and start them toward the front or pilot end, and a trailer truck or cars, one of said cars being shown in Fig. 1, but in the practical arrangement, two or more of such cars can be used. The trailer car has primarily for its purpose, the sustaining of the main power engine or motor, the operator or operators and such accessories that may be required for handling the entire machine, and such trailer trucks are also provided for sustaining the straight-way or over-head portion of the endless track and for holding said endless track in position for proper engagement with the conveying drums or wheels of the front and rear traction mechanisms.

The front and rear traction mechanisms are each driven by a separate engine or motor that receives its energy from the main engine or motor, carried on the trailer car, as will be clearly understood by reference to Fig. 1. The intermediate traction car or cars used in connection with my machine have their traveling wheels each secured to its end axle or shaft whereby they can turn independent of each other and adapt themselves for turning shortly to the right or to the left upon the endless track with but a minimum amount of friction, as will presently more fully appear.

The trucks for the front and rear traction devices are constructed substantially alike and one of such trucks is shown in Fig. 7, by reference to which it will be seen that the said track is composed of three pairs of longitudinally arranged beams, the central ones being designated 6—7, the outer ones 10—11 and 12—13 and the several longitudinal beams are joined by cross members 8 and 9. Each pair of longitudinal beams is an individual frame so as to give perfect solidity to the construction, and the outermost pair of longitudinal beams 10—11 and 12-–13 are provided for one purpose while the intermediate pair of beams 6—7 are utilized for another purpose, as will hereinafter appear.

The front traction truck includes a pair of drive shafts 5, mounted in each end of the truck frame in bearings 68 projected vertically from the longitudinal beams and the rear track frame is provided with a similar drive shaft 23 which is mounted in bearings 106 pendently projected from the longitudinal beams, such correlative arrangement of the shafts 5 and 23 being provided to compensate for the differential diameters of the driver gears 16 and 4 of the front and rear traction devices.

The driver gears 16—16 and 4—4 which are in the nature of cogged drive wheels, are fixedly secured to the shafts 5 and 23 and these gears are arranged in longitudinal alinement and have for their object to engage and coöperate with the centrally located rack rail 27 of the track-way, see Figs. 11 and 16, and each of the cog drive wheels 4 and 16 have double flanges 133 for engaging with a pair of flat rails 35—35 on each side of and adjacent to the rack rails 27, the detailed construction of which is clearly shown in Figs. 12 and 13 and the said flanges 133 also have for their object to keep the drive wheels 4 and 16 in proper position upon the rack rails as well as serving the function to direct the movement of the whole apparatus or machine upon the endless track. The drive wheels 4 and 16 serve as a main support for the apparatus and sustain the main weight thereof to insure proper adhesion between the said drive wheels and the rack track-way.

The front and rear traction trucks are each provided with oppositely and centrally disposed pendent buffer springs 2 which are secured upon the outer longitudinal beams 10—11 and 12—13. These springs carry central bearings in which are pivoted short axles 69, see Figs. 3 or 4, upon which is secured to turn with the axles, the flanged balance and guide wheels 3 which are designed to coöperate with that portion of the endless track formed by the Y-shaped tread rails 91—92—93, as clearly shown in Fig. 24, said balance wheels 3 serving to maintain a proper balance in the entire machine and keep the trucks in proper position with respect to the track. The balance wheels 3 are also provided with flanges 132 upon their outer sides which serve to keep the said balance wheel in proper position on the surface of the Y-shaped tread rail, said flanges also serving as auxiliary wheels since their periphery wheels serve to run upon sectional bridge portions 137 which lap the intervening spaces that separate the Y-shaped rail links, as will hereinafter appear.

Since the super-structures upon which the independent drive mechanism for the forward pilot truck and the rear or trailer truck are of like construction, a detailed description of one of said super-structures will be sufficient for both and in describing the said super-structure, the parts supported thereby and coöperating therewith, I will refer more particularly to the pilot or front end of the machine.

By referring now more particularly to Figs. 3 and 5 and 6, it will be noticed that upon the longitudinal beams 6—7, 10—11, and 12—13 are secured vertically extended semi-circular supports 39, upon the outermost ones of which are mounted the bifurcated ends 40 of the vertically extended members 41 which are connected at the top by a cross bar 36, and the lower ends of the said bifurcated members 40 have an integral base 138, by means of which they are fixedly supported upon and projected upwardly from the outermost semi-circular members 39. Similar members 40ᵃ are mounted upon the curved supports 39 attached to the longitudinal frame or timbers 6, 7, 10 and 12, and the several frame members 39 and 40 are transversely braced by bars 129, shafts 44 and transverse bars 130, whereby to provide for a proper rigid construction.

The vertical extensions 41—41 of the outer vertical or yoke frames 40 are extended sufficiently above the overhead sections of the track to provide for the accommodation of a transverse shaft 61, upon which is mounted a presser roller 25, the purpose of which is to keep the endless rack track sections in firm contact with the driver cog gear 50, presently again referred to, and for guiding the outer or guide tracks of the endless chain, rollers 49 are provided for engaging with the under side of the said guide tracks, as clearly shown in Fig. 3, by reference to which it will be noticed that these rollers are journaled upon shafts 48, mounted in the adjacent outermost vertical members of yoke frames 47, and similar rollers 49ᵃ are provided, which are sufficiently separated to straddle a complete series of the track-way, whereby to engage with the under side or guide track sections in a manner clearly shown in Fig. 3, by reference to which it will be noticed that the said rollers 49 are as before stated mounted upon short shafts journaled in pendent bow frames 47, suitably secured to the yoke frames, as clearly shown in Figs. 3 and 4.

The flanged over-head rollers 49 and 49ᵃ are assembled in sets of three on each side of the truck, and, as will be seen from the drawings, are located in the same vertical plane with the balance wheels 3 on the traction truck and their main object is to coöperate in supporting the Y-shaped portions on the side guide or tread rails of the track-way, and furthermore, these flanged side rollers 49 and 49ᵃ, by reason of having their short axles 48 and 48ᵃ separated from each other, a distance equal to the length of the sections of the track-way, a simple and effective means is provided for the automatic turning of the over-head sections of the track and thereby provided for the machine following the curves of the track-way as they are adjusted to provide for the manipulation of the front or pilot section.

51 indicates a double crank shaft mounted transversely in bearings formed upon the innermost pairs of the yoke frames 40 and this shaft 51 carries a drive cog wheel 50, before referred to, and which lies in the longitudinal plane of the front or pilot section and rear traction drum or drive wheel. The cog drive wheel 50 has for its object to coöperate in supporting and moving the over-head portions of the truck, by means of engaging with the rack links 27 thereof. The vertical frame members 39 and 40, which are assembled in pairs on the inside of the truck, also serve as convenient means for supporting the power mechanism and to that end, a steam, explosive, or electric engine, indicated by 46, is mounted and secured vertically between the cross pieces 129 and 130 to the yoke frames and in such manner that the piston rod of the said engine is arranged to reciprocate vertically and to act on the several guide wheels, whereby to give freedom or flexible adjustment to the traction truck when it follows the curves on the road.

The piston rod 3ᵃ is connected with three drive wheels for the front or pilot end of the machine, by means of a horizontally disposed oscillating lever power 42, which is fulcrumed at 44 upon a semi-circular frame member 39. Near the center the bar 42 has a slot 79 in which the end of the piston rod is pivotally secured, (see Fig. 3).

45 designates a pair of straddle pitman rods which are connected at one end to the cranks 51ᵃ of the shaft 51 and have their other ends connected to a cross rod 51ᵇ that takes through the slot 79 in the bars 42 and by reason thereof, the motion is imparted to the drive wheel 50, before referred to.

Each oscillating lever bar 42 has its free end joined with a pitman rod 43 and the said rods 43 are connected to the cranks 23ᵃ on the shafts 23 that carry the cog driver gears 16, it being understood that a similar arrangement of pitman bars 43ᵃ is provided for the rear traction truck which connects with the drive cogs 4, but these cogs, it should be stated, are of less diameter than the front drive cogs 16, since their function is more in the nature of guides for holding the track-way down, than to act as guide members.

The power mechanisms each receive the working agents which may be steam, explosive gas, or electric current, from the main power carried by the intermediate or trailer car, and the said power mechanisms mounted upon the truck have for their object to move in unison the several drive wheels of each traction truck.

Upon each side of the drive gears 16 are mounted sprocket wheels 15, and the foremost wheels 15 are coupled with a sprocket wheel 20 mounted upon the shaft 21 of the main or driver drum or truck laying wheel 22, through the medium of the drive chains 24, which impart the required rotary motion to the pilot or track laying wheel 22, as clearly shown in Figs. 3 and 7. The track laying or drum wheel 22 has its axle centrally located with respect to the height of the entire apparatus, and it is of a polygonal shape with its polygonal sides provided with cogs except near their corners, and the polygonal sections, in practice, mesh with the cogs on the rack links 27, in such manner as to insure a perfect automatic and systematic adjustment of the moving sections of the track on the polygonal sections of the drum wheel 22 as power is applied to the same. The polygonal wheel 22 has longitudinally projected ribs 22ᵃ, see Fig. 7, on each side of its toothed portions, which coöperate with the adjacent flat or guide rail portions 35 of the rack track, and these side ribs provide for properly supporting the several sections of the track as they are being passed through the said wheel. The wheel 22 is mounted upon a transverse shaft 21, loosely mounted upon a pair of long poles 17—17 that project forwardly from the semi-circular members 39 and they are braced at their outer ends by the diagonal brace rods 131 that connect at their upper ends with the top of the outermost yoke frames 41. The transverse shaft 21 is rotatably held in bearings that are secured at the extremities of the U-shaped frame 18, see Fig. 8, which is centrally and pivotally joined to a cross beam 137 on the main truck frame, the ends of which are fastened to the yoke frame 41, said frame 18 being necessary to fasten and to freely allow the turning of the large polygonal drum or drive wheel 22 to the right or left.

To hold the several sections of the track rail firmly against the outermost face of the polygonal sides of the drum or drive gear as they pass thereover, a pair of presser rollers 25ᵃ—25ᵃ which are individually rotated in the extremities of the spring rods 67, which extend over the front of the pilot or drive wheel and are mounted on the cross bar 61 supported in the outer extremities of hanger rods 19 which are supported upon the shaft 21 and have their inner ends linked in eyes on the frame 18, as clearly shown on Fig. 7 of the drawings.

By referring now more particularly to Figs. 3 and 4, it will be noticed that the drive wheels 4—4 are of considerable less diameter than the front guide wheels 16—16, such relation of the front and rear drive wheels being to provide the machine with adequate means for climbing hills, and it will also be noticed that the rear traction truck supports upon the bars 17 that are secured to the frame 39 and extend rearwardly therefrom, a drum wheel 22ᵃ which is similar in arrangement and construction to the pilot frame or drive wheel 22, hereinafter described, with the exception that it receives power from independently mounted sprockets 54, mounted upon the shaft 55, journaled in cross bearings 53 to the yoke frame 39, power being imparted to the drum wheel 22ᵃ by chains 24ᵃ that take around the said sprockets 54, and the sprockets 20ᵃ, mounted upon the shaft 21ᵃ that carries the drum wheel 22ᵃ and which is also loosely supported upon the bars 17ᵃ in a manner similar to the support for the pilot or forward drum 22, and a similar driver or guide roller 25ᵇ mounted upon arms 67ᵇ secured upon a shaft 61ᵃ mounted in the frame bars 19ᵃ linked to the yoke frame 18ᵃ in the same manner as the similar parts are adjusted on the front end of the machine.

The rear drum wheel 22ᵃ is driven by a motor 46ᵃ, mounted upon a yoke frame and whose piston 45ᵃ connects with the oscillating levers 42ᵃ which in turn are linked to planks 55ˣ on the shaft 55 and which, through the medium of the link rods 43ᵃ are joined with the plank members 5ᵃ of the shafts 5 that carry the guide wheels 4—4. The oscillating levers 42ᵃ are connected by link rods 45ᵇ with the cranks of a shaft 50ᵇ that carries a centrally disposed or auxiliary drive gear wheel 50ᶜ and which acts the same as a similar but larger drive gear wheel 50 on the front end of the machine.

The intermediate cars or trailers, it will be understood, are pivotally connected with the front and rear traction truck so as to provide for a proper side flexure in turning curves, etc., etc. The truck of the intermediate or trailer car, the construction of one of which is shown in detail in Fig. 9, is constructed similar to the trucks for the front and rear trucks, except that the shafts carrying the central wheels have no crank members and the central wheels designated 112, mounted upon the shaft 109 have their peripheries formed for engaging with the toothed and smooth rail portions of the endless track, and the said trucks are also provided with side flange wheels 104 for coöperating with the Y-shaped portions of the outer or guide sections of the endless track, the outer flanges of said wheel 104 acting as auxiliary wheels to coöperate with the bridge portions 137 of the Y rails, hereinafter referred to.

The intermediate or trailer cars, illustrated in Fig. 2, aforesaid, have segmental horizontal racks 115—115, the purpose of which will presently appear. Each intermediate car or trailer truck has a fifth wheel 98, upon which the box car is mounted and upon the top of the said box cars, a special means is provided for supporting the overhead sections of the truck as it passes from one end of the machine to the other, and the said special means comprises a rectangular shaped horizontally disposed frame 57, shown in detail in Figs. 2 and 10, which is also divided into three longitudinal partitions in which are mounted in individual bearings, three rotatable shafts 66, upon which are secured side rollers 58 which are assembled in pairs on each side of the frame 57 to coöperate and engage a pair of Y-shaped tread rails, as clearly shown in Fig. 6. Each of the three shafts 66 also carries a centrally disposed double flanged and peripherally toothed roller 59, which have for their object to support the central track rail links of the track-way and the said three pairs of shafts 66, in the practical arrangement of the complete machine, are separated from each other a distance equal the length of the several track sections in order to effect a proper and automatic turning of the overhead track portions when the machine follows curves. A fifth wheel 63 is also pendently secured to the central portion of the frame 57 and is rotatable upon the annular guide 57ᵃ, secured upon a stand 65, centrally mounted upon the trailer or box car, as clearly shown in Fig. 2. The fifth wheel 63 is situated in vertical alinement with the fifth wheel of the trailer truck to provide for a proper lateral movement or oscillation of the trucks, and the overhead track supporting frame 57, and to keep the overhead track properly adjusted upon the rollers 56 and 59, a presser roller 25ᵈ is held to engage the upper face of the central or rack portion of the track and the said roller 25ᵈ is mounted upon transverse tie rod 36ᵈ, the extremities of which are secured in the standards 41ᵈ that extend upwardly from the frame 57.

The frame 57 is provided at one or both of its ends with segmental gears 119 which coöperate with the segmental gear portions 115 of the bottom or trailer truck and the said segmental gears 115 and 119 are arranged to mesh with opposing segmental gears 116 and 118, mounted upon the upper and lower ends of the vertical and rotatable shaft 117, having bearings in the upper and lower extensions or projections of the car frame, as clearly shown in Figs. 2 and 9, such arrangement of parts imparting a steady and uniform movement to the truck frame and the over-head frame 57, while passing around curves and thereby maintaining a uniform flexure or lateral bending of the upper and lower sections of the endless track.

Having thus described the detailed construction and arrangement of the traction trucks or trailer cars, the drum wheels which form the traction, driving and track laying mechanism, and the main essentials of my invention, I shall now proceed to describe in detail the construction of the endless track which coöperates with the said parts and, together with said parts, form the complete structure of my invention.

By referring now more particularly to Figs. 16 and 17, it will be noticed that the endless track is composed of obliquely disposed frame sections which are supported and connected to coöperate with the traction feet, a rack rail link, and the side tread rail, all of which form a coöperative part of the completed endless track.

The detailed construction of the rack rail links is best illustrated in Figs. 11 and 15, by reference to which it will be seen that each section of the endless track includes an obliquely arranged supporting frame, see particularly Figs. 16, 19 and 22, which frame consists essentially of the converging bars 70, the inner or adjacent ends of which are extended at obtuse angles whereby to form parallel short longitudinal extensions 72—72 and each of the said frames includes transverse or main bars 80 which are secured to the side bars 70 by passing the said side bars 70 through apertures 82 in the outer ends of the said main bars 80, and the said transverse bars 80 have extensions 82ª, the extremities of which extend through the small slots 84 on the under side of the member 92 of the Y-shaped tread rail links, hereinafter again referred to, and as best shown in Fig. 21, and the extensions of bars 80 have for their object to sustain and maintain under a proper position, the Y-shaped tread rail links when the endless track is turned upside-down when going over the cars.

The separated ends of each of the converging bars 70 carry at their extremities, a section of a traction foot which is made up by semi-circular prolongations 73 on the outer end of the bars 70, as best shown in Figs. 17 and 18, by reference to which it will be also observed that a third bar 77 secured at its center 78 by the bolts to the cross bar 80 has its outer ends bolted to the semicircular portion 73 of the side bars 70. The said bars 77 carry at their outer ends traction foot members 75 which are adjustably secured and which coact with semicircular adjusted traction foot members 74 secured on the outer sides of the circular ends of the frame bar 70, as shown. Each traction foot section 75, carried by a cross bar 77, is adapted to be adjusted uniformly with the traction feet 74 carried by the bar 70 so, as to steady the whole machine and brace it from lateral movement while passing over the ground and to further such action of the foot members, the traction feet 74 are disposed at right angles to the center or connecting portion 73.

It is not absolutely necessary that the bar 77 be provided at its ends with traction feet as its extremities may be joined to the sectional traction foot 73 by riveting or bracing it to the said foot 73 in any well known manner, and if desired, the third traction foot member 75 can be secured to the other two sections of the traction foot 74 whereby to form a series of traction feet members to adapt the machine to go over sandy or country roads, as will be presently more fully stated, and furthermore, while I prefer, for the reason stated, to use the particular shape or form of traction feet described and shown, it is manifest that the foot members may be modified in their structure to suit the requirements or character of the land over which the machine may be required to travel.

The converging bars 70, the brace bar 77 and the cross bar 80 also have for their purpose to support a pair of bearings 34 which partially rest on the top of the said bars, as clearly shown in Fig. 17. The bearings 34—34 which are in parallel alinement, are located at equal distance from the middle of each supporting frame and these bearings furnish means for connecting the said supporting frame members. The supporting frame members before referred to, can be constructed either in an extended manner, as shown in Fig. 17, or they may be constructed in a contracting manner, as shown in Fig. 23, the contracting form of the supporting frame being preferably for heavy loads.

A horizontally disposed pivoted rack holder or coupling device 85 is journaled in each pair of bearings 34, as best shown in Fig. 14, and the said holder 85 is of rectangular shape, in vertical view, and has a pair of oppositely disposed journals or pivots 85ª—85ª, see Fig. 15, which forms an integral part of an upper cross bar. The top surface of the upper cross bar 85 at its center is longitudinally recessed and formed with a central bearing aperture to receive a pivot or fulcrum pin 88 which secures one end of a rack section to the coupling device 85, the said rack section being formed with a slot 26ª, see Fig. 12, for slipping over the flattened part of the cross bar 85, the extension 27ª of the pendent member 27 of the rack section fitting within the yoke member 86 and its front end resting upon the bottom bearing which has an aperture 88ª which coincides with the aperture 88ᵇ to receive the pendent pin which also passes through the extensions 27ª of the pendent flange of the rack rail sections. The other end of each rack rail section is mounted to move laterally upon a bearing that forms a part of the endless track sections. Each of the rack rail links 27 forms one of the elementary parts of the complete track-way and the rack rail links 27 are each formed of a rectangular bar with rack teeth 26 projected therefrom and with a pair of adjacent flat rails 35—35 which project laterally from the rack face, as clearly shown in Fig. 13. One end of each rack rail link section has a pendent angle portion 38 secured to the center of the transverse bar 80 of the track frame member hereinbefore described, and the other end of each section pivotally includes a pivot holder 85 as before stated, and in such manner that the upper branch or face is provided with rack teeth sustained straight on top of the flat bearing of the pivot holder and lower or extension branch 27 that is held inside of the rectangular frame 85.

To provide for a proper operation of the track rail section, it is necessary that one tooth terminates at each end of each rack link and that small space separates the consecutive rack links to prevent the teeth of the said links from interfering with one another when the track is moved around the polygonal wheels, for by reason of such arrangement, the drive wheels will positively engage in a progressive and continuous manner, all of the teeth of the rack rail links. By reason of the rack bar rail links joined with the frames 70 and their cross bars 80 in the manner mentioned, the connection can be effected with the free end of the rail bar 77, as shown in Figs. 17 and 23, or any other place along the length of the rack, for example, as shown in Fig. 16. By reason of forming the ends 72 of the frame member 70 in the manner hereinbefore described and shown in Fig. 33, the said bar 70 can be readily secured against the sides of the rack bar.

The Y-shaped tread rails which form a part of my complete endless track construction, generally are made up of the diverging or Y rail links 91 and 92, the converging ends of which are securely bolted to an extension 93 of the rail link 92 and each member 93 in turn is pivotally connected to bridge rails 137, as best shown in Fig. 21. The member 92 of the Y-shaped tread portion, serves as a rail member for this reason,— that the top of its surface is on the same plane as the main or mono rail section 93, and to provide for a proper turning of the track to the right or left, the branch 92 is flared inwardly at a slight angle from the prolongation of the said mono rail 93, and further, this inside branch member 92 is also provided with an elongated slot 97 which begins in the rail at its juncture with the mono rail 93 and extends rearwardly until it reaches the outer edge of a traction foot carrying transverse bar 89, presently again referred to.

Near its rear extremity, the branch 92 has a pendent portion 92$^a$ provided with a transverse aperture 136 which has for its object to receive therethrough either the transverse bars 77 when the form of frame shown in Fig. 17 is used, or a similar transverse brace bar 95 when the form of frame in the modified construction shown in Fig. 23 is used, the said bar 95 or 77 being held in place by the cap plate 94, as shown in Fig. 21.

The top surface of the outside Y-branch 91 and the flat surface 94 are in the same horizontal plane with the bottom of the slot 97 on the branch member 92, and the purpose for having such parts in the plane stated, is that they will freely support the extremities of the transverse jointer rod 89 which supports the outside branch 21 of the mono rail 93, see Fig. 21, and also helps to sustain the bridge bearing 137 which will be presently again referred to, and the said outside branch 91 is also formed with a slot 97$^a$ to receive the ends of the rod 89.

Each Y-shaped tread rail portion consists essentially of the members 91, 92 and 93, and is supported above the ground by an elongated traction foot 96 situated on the outer end of the branch member 91 and the said traction foot 96 is joined to the traction feet 73 and 74 by means of the transverse bearing 95 when the contracted form of the supporting frame shown in the modified construction in Fig. 26, is used.

The sectional traction feet 96$^a$ and 75 have a plurality of tenons, by which they are secured in corresponding apertures existing in the prop or bearing portion 76 of the traction feet members 96 and 74, previously referred to, and when the transverse bearing 95 is used, it is inserted in the aperture 136 formed on the under side of the Y branch member 92 whereby to support that branch member above the road.

The transverse rod 89, before referred to, is held to move around a vertical pivot, which may be the pin 18 projected below the under side of a truck, and the said rod passes through the bottom slots 90—90 in the converging bearing 70 and the members 77 as shown in Fig. 23, and the extremities of the said rod 89 pass through the slots 97 and 97$^a$ in the Y-shaped sections 91 and 92. By providing the transverse rod member 89 as stated, a support in the free end extremities of the mono rail members 93 of the next track section is provided, said bars 89 also serving to support one end of the bridge member or bar 137 which pivotally connects with and extends forwardly from the mono rail 93, and has for its purpose to bridge over the side gap existing between the two consecutive Y-shaped tread links, one of the ends of the said bridge being supported on the jointer rod 89, the other end being held to slide upon the surface plate 94 of the member 91 of the next adjacent Y rail portion of the track, see Fig. 21.

It will be noticed that the transverse rod 89, in itself, has no pivotal connection, but it forms a pivotal support for the mono rail 93 and to provide against the said rod 89 having lateral movement independent of the mono rail section 91, the said rod at the point where it passes through the mono rail, see Fig. 25, is formed with grooves or depressions 134 to receive the correspondingly shaped portions of the mono rail 93 as it engages therewith.

The Y-shaped tread rail links, each of which consists essentially of members 91, 92 and 93, are assembled in bearings and are mounted on their elongated traction feet 96, 96$^a$, 74 and 73 to coöperate with the balance wheels 3 and the flanges 132 on the traction cars and to also coöperate with the overhead flanged side rails 49 and 58 of the machine as hereinbefore described. The several rail links that are situated on the same side of the track, overlap each other in such a manner that the extremities of the mono rail 93 are interlocked between the branches 91 and 92 of the next tread rail section and it is slightly pressed against the inside branch 92 of the said adjacent or next tread rail section and the transverse jointer rod 89 which is set across each section of the track passes through double slots 97—97$^a$ to the assembled tread rails in pairs, and thereby pivotally supports the ends of the mono rails 93—93 belonging to the next track section, as clearly illustrated in Figs. 21 and 23.

Fig. 30 shows a modified form of endless main track and in this form the track comprises links which are pivoted together on the transverse main bars 80, of the track supporting frame sections and the said auxiliary rod rail links are made up of telescopically arranged members 28 arranged to slide into each other and the said member 28 has a cross shape in transverse direction and the member 29 is a counterpart of the member 28 in cross section. The outer link 29 is forked at one of its extremities to produce two branches adapted to be supported and slide in slots located near the bottom of the transverse main bar 80 and have also for their object to produce a slot base for the construction of the telescopically arranged rails, as described.

A pair of hangers 20 which carry bearings on the top are fulcrumed on each side to the bottom of the main bar 80 and horizontal pivots 32 are journaled in the said hangers and the extremities of the auxiliary rod rails and 29 are pivotally secured by a vertical pin 29ᵃ upon the said horizontal pivots 32 and by such construction each section of the auxiliary rod rails can flex in a vertical and horizontal plane and can also augment or diminish their horizontal end, the main track sections being pivoted on their horizontal axles and by reason of the auxiliary rod rail links following each other, a continuous and even line of translation for the overhead pressure rollers 25 and 25ᵃ is carried by the traction cars as presented, and with which the said rollers coöperate to keep the main track in engagement with the overhead cog wheels and the central rollers of this machine.

Having thus described my invention, the operation of the complete machine can be briefly stated, as follows: The track being turned slightly to the right or left has a plurality of sections which pivot in the center of the track, a central rack rail link, and the Y-shaped pairs of side tread rails are laid in the back, the consecutive segmental curves, the tread rails being situated on the outer curve to augment in length and the tread rails on the inside curve to diminish in length, by sliding in the elongated slots of the next tread rail system, which will be readily understood by reference to the drawing.

In operation, the traction trucks and trailers will be moved by the power exerted from the main motor that passes to the steam or gas cylinders carried by the front and rear traction trucks which causes the rotation of the front and rear drum wheels and various drive wheels controlled thereby. The drum wheel is supported by the pilot traction and as it moves forward serves to lay the track and the drum wheel situated on the rear of the machine as it turns, raises up the track, and since the track is an endless one, it is constantly being laid at the front of the machine as it is being taken up at the rear. When it is desired to turn curves, it is only necessary to adjust the central drum wheel of the pilot track obliquely in the direction desired and the rail track then by its own mechanism will be laid in a curve and the pilot traction car, the intermediate trailer car or cars and the rear traction car, all of which cars are flexibly connected to one another, will follow the curves of the track as it is being laid and the overhead sections of the track will also turn automatically and correspondingly with the curves or in other words, the bottom horizontal section of the track which is under the machine and the top horizontal section of the machine which is above the machine have the same curvature.

It will be understood that the mechanism I have disclosed in the drawings and which I have herein described as presented, is a joint and the practical embodiment of my invention, but I desire it understood and it will be readily apparent to those skilled in the art to which my invention appertains, that the details of construction and the several coöperative combination of parts which have been herein set out specifically and which are illustrated in detail in the drawings, may be readily modified or varied without departing from the spirit of my invention or the scope of the appended claims.

Having thus described my invention, what I claim and desire to secure by Letters Patent, is:—

1. A mechanism of the character stated which embodies the following elements in combination, a car body, a truck that supports the said body, an endless flexible track with which the car truck engages, means for supporting and conveying a portion of the endless track upon and over the car, and another means for laying and picking up the track, said means including a source of propelling power on the cars.

2. In an apparatus of the character stated, a car, an endless flexible track for the car, means mounted on the car for supporting and turning the track overhead, another means carried by the car including a source of propelling power which coöperates with the track for moving the car over a portion of the track and coöperatively moving a portion of the track over the car, and mechanism sustained by the endless carrier and coöperatively joined with the propelling force mounted on the car for laying and picking up the track.

3. In an apparatus of the character stated, a plurality of cars, an endless flexible track for the said cars, means carried by the said cars for supporting and turning the track overhead, another means supported on some of the cars and coöperating with the track for moving the cars over a portion of the said track and coöperatively moving a portion of the track over the cars and devices supported by the carrier and coöperatively connected with the car for continuously laying and picking up the track, as set forth.

4. In an apparatus of the character stated, an endless track, a means coöperatively mounted upon the track at each looped end thereof, said means including an overhead support over which one portion of the track passes, another means coöperatively joined with each looped end of the track for laying and taking up the track and a source of energy for propelling the said laying and taking up means, substantially as shown and described.

5. In an apparatus as described, a plurality of supporting cars, an endless flexible track for the said cars, the latter having overhead means for sustaining the upper portion of a track, a motor on each of the said cars for propelling the car wheels on the endless track, and mechanism projecting outwardly from each supporting car that coacts with the flexible track and is adapted to lay or to take up the said track as set forth.

6. In a combined mechanism of the character stated, a plurality of cars, an endless flexible track for the said cars, means sustained upon each car for supporting the overhead portion of the flexible track and for laying or taking up the track, and another means mounted on some of the cars for moving said cars along on the endless flexible track, as set forth.

7. In combination with an endless flexible track, a car mounted thereon at each end of the track, and having track wheels for engaging the bottom portion of the track, a truck wheel mounted on the upper end of each car for engaging the upper portion of the track and means sustained on each car for laying and elevating the track, actuated by the movement of the cars on the said track and a propelling means on some of the cars for conveying the cars along on the bottom portion of the endless track.

8. In combination with an endless track composed of sections flexibly joined to relatively bend in longitudinal and lateral directions, a tread frame portion for each of said sections, the said sections including a central longitudinally extended rack; of a traction car mounted in each of the looped ends of the endless track, said cars having bottom traction wheels for engaging the rack portion of the track sections and each having an overhead drive gear for supporting and engaging the rack on the track sections, and means carried on the cars coöperatively connected with the bottom traction wheel and with the overhead traction gears for imparting motion to the said wheels and gears, for the purposes specified.

9. In an apparatus of the character stated, a pilot traction car, a rear traction car, an endless flexible track with which the cars engage, supports on the cars for sustaining the overhead portion of the endless flexible track, connections that join the cars with the track sections for turning the said cars with the lateral flexure of the track, and means mounted on the cars that coöperate with the track for moving the said cars along the track and simultaneously moving the overhead portion of the track.

10. In combination with an endless flexible track, composed of sections having connections for effecting longitudinal and lateral flexure of the track; of cars mounted on the bottom section of the track, one at each end thereof, means on the cars for sustaining the overhead portion of the track and another means on the cars for moving the said cars forward on the bottom or base portion of the endless track and simultaneously conveying the overhead portion of the track rearwardly, as set forth.

11. In an apparatus of the character described, in combination with an endless flexible track; of a pilot traction car, a rear traction car, an intermediate frame, a truck on which the frame is rotatably mounted, means rotatably supported on the top of the frame carrying roller supports with which the overhead portion of the endless track engages, the connections of the supports and the track being such that the flexure of the track turns the said supports with the track, intermediate members that join the said rotary roller carrying means with the truck on the said frame adapted for turning the said truck in harmony with the rotary movement of the rotary carrier, mechanism on the traction cars for moving said cars forwardly upon the endless flexible track and at the same time moving the overhead portion of the said track rearwardly, as set forth.

12. In an apparatus of the character described, an endless flexible track which includes a pair of side tread rail sections and an intermediate sectional rack rail, a plurality of traction cars movable along the said track and each of which includes the traction truck having cog gears for coöperating with the intermediate rack rail sections and side balance wheels for coöperating with the side tread rails and mechanism on the cars for simultaneously laying one portion of the endless track and taking up and conveying the remainder of the track rearwardly.

13. An apparatus of the character described, comprising an endless track composed of sectional side tread rails and a sectional intermediate rack rail, traction cars movable on the said track, means on one of the cars for laying down the track section, means on another car for picking up the track section, a traction truck for each of the cars, each truck including cog wheels for engaging the central or rack rail sections of the track, and side balance wheel for engaging with and coöperating with the side tread rails, means for moving the car forwardly simultaneously with the laying of one part of the track and the picking up of the other part thereof.

14. An apparatus of the character described, comprising an endless track composed of sectional side tread rails and a sectional intermediate rack rail, said rack rail having laterally disposed smooth bearing flanges, traction cars movable on the said track, means on one of the cars for laying down the track sections, means on another one of the cars for picking up the said track sections, a traction truck for each of the said cars, each truck including traction wheels having a cog rim and lateral bearing flanges for engaging the lateral smooth bearing flanges of the rack rail sections and having side balance wheels for engaging, and coöperating with the side track tread rails and means on the car for moving them forwardly on the track as the track is being laid and picked up, substantially as shown and described.

15. An apparatus of the character stated, comprising an endless track composed of side tread rails and an intermediate rack 27 provided with a pair of adjacent bearing flanges 35—35 front and rear traction cars movable on the said track, means on the front traction car for laying down the sectional track and means on the rear traction car for picking up the said track, a traction truck for each of the said cars which includes a main frame, a pair of double flanged cog wheels mounted on the main frame for coöperating with the rack 27 and its adjacent bearing flanges 35, side balance wheels 3 mounted on the said main frame for coöperating with the side tread rails, a vertical frame member 39—40 mounted on the truck main frame, a standard 41 secured on the top of said vertical frame member, a polygonal drum having a cog rim mounted upon the pilot traction truck and in front thereof, a similar drum and cog gear mounted on the rear traction truck, said cog gear drums coöperating with the intermediate rack rails 27, each of the said drums having bearing flanges for engaging with the bearing flanges 35—35 of the rack rail sections, and means for turning the drum wheels and maintaining the flexible track thereon, substantially as shown and described.

16. An apparatus of the character described comprising an endless track composed of sectional flexibly joined side tread rails having Y portions, an intermediate section flexibly joined rail having a central rack portion 27 and adjacent smooth bearing flanges 35—35, traction cars movable on said endless track, said cars including a traction truck, composed of a horizontal main frame formed of a series of longitudinal beams and cross beams that join the longitudinal beams, a plurality of centrally disposed drive wheels mounted on the track, each having a central peripheral cog rim and a flat lateral flange on each side of the cog rim for coöperating with the track rack 27 and the bearing flanges 35—35, a pair of balance wheels 3 mounted on the outer longitudinal beams of the track frame for engaging the side bearing rails of the endless track and means carried on the car that coöperate with the endless track for moving the cars forward upon the track and simultaneously laying one part of the track and picking up the other part thereof.

17. An apparatus of the character stated, comprising an endless flexible track in which is included tread and rack rails, a plurality of traction cars movable upon the said track, each traction car including a traction truck in which is embodied a horizontally disposed main frame, a vertical frame mounted on the main frame, means mounted on the top of the vertical frame members for supporting the overhead portion of the track and other means mounted on the cars for moving the cars forward, laying one portion of the track as the other portion is being picked up, substantially as shown and described.

18. An apparatus of the character stated, comprising an endless flexible track which includes side treads and a central rack rail, a plurality of traction cars movable on the said track, each of which includes a truck in which is embodied a main frame, composed of three pairs of longitudinal beams and a pair of connecting cross beams, vertically extended frame members 39 and 40 mounted upon the said main frame, said vertical frame members consisting of curved sections extending upwardly, one pair of vertical frame members being secured on each side of the traction truck, an intermediate pair of vertical frame members secured on the inside longitudinal beams of the said truck, means for bracing the frames transversely, means mounted on the top of the vertical frame members for supporting the overhead portion of the track and means for moving the said cars toward the track and simultaneously laying one portion of the said track as the other portion thereof is picked up and conveyed forward as set forth.

19. An apparatus of the character stated comprising an endless flexible track which includes side tread and central rack rails, a plurality of traction cars mounted on the said track, each car including a truck in which is embodied a horizontally disposed main frame, vertical frame members supported on the main frame, said vertical frame members including an intermediate pair of frames, the transverse brace rod 130 for securing together the plurality of vertical frame members, the drive cog wheel 50 mounted on the top of the intermediate pair of vertical frames for coöperating with the rack rails and means on the cars for moving the cars forward, laying one portion of the endless track while at the same time picking up another portion thereof and feeding the overhead section forward, as set forth.

20. In an apparatus of the character stated, an endless track composed of a plurality of sections flexibly joined with one another, each of the said sections including a supporting frame member, a pair of side tread rails and a centrally disposed rack rail carried by the supporting frame.

21. In an apparatus of the character stated, an endless track composed of a plurality of sections flexibly connected with one another, each of said sections including a supporting frame, a centrally disposed rack rail mounted on the supporting frame, tread rail sections on each side of the said supporting frame and means for connecting the said tread rail sections to the supporting frame.

22. An apparatus of the character stated, an endless track composed of a plurality of sections flexibly combined with one another, each of said sections including a supporting frame, a centrally disposed rack rail mounted on the said supporting frame, tread rail members on each side of the said supporting frame, a transverse bar 82 centrally sustained upon the supporting frame, said bar 82 having its opposite ends connected with the tread rail sections and means for connecting the said tread rail links or sections together.

23. In an apparatus of the character described, an endless track composed of a plurality of sections flexibly connected with one another, each of said sections including a supporting frame, a centrally disposed rack rail mounted on the supporting frame, the outer tread rail sections, the transverse bar 82 sustained by the supporting frame and connected at the opposite ends with the tread rail sections, said tread rail sections including Y-shaped portions, the said Y-shaped portions having elongated slots 97—97ª, the transverse jointer rod 80 that passes through the slots 97—97ª, means for pivotall connecting each Y-shaped tread rail member with the next preceding Y-shaped tread rail member and another means for supporting the said track tread rail section over the ground.

24. In an apparatus of the character stated, an endless track composed of a plurality of sections flexibly connected with one another, each of the said sections including a supporting frame, a centrally disposed rack rail section, a pair of opposite side tread rail sections, auxiliary rod rail links connected to the said supporting frame, pivot holders connecting the several track sections, a transverse axle jointer to connect the opposite tread rail sections, sectional traction feed connected to said track sections and means for coöperatively connecting the supporting frame, the central rack rail, the side tread rail, pivot holders, auxiliary rod rail, transverse rod jointer, and the sectional traction feed, for the purposes specified.

25. In an apparatus of the character described, a pilot traction car, a rear traction car, a vertical frame on each of the cars, overhead rollers on the upper ends of said frames, an endless flexible track for the cars, a portion of which is coöperatively supported and turned by the overhead rollers, means mounted on the vertical frame for propelling the cars along the track and simultaneously moving the overhead track portion forward, and means sustained by the pilot car for laying the track and another means sustained by the rear traction car for picking up the track, as set forth.

26. An apparatus of the character described, comprising the following elements in combination; an endless flexible track composed of sectional opposing side tread rails, and an intermediate sectional rack rail, the several rail sections being pivotally joined for vertical and lateral flexure, a pair of traction cars movable on the said track, said cars having means for sustaining and guiding the overhead portions of the track, propelling mechanism mounted on the cars for moving the said cars forward, an automatically operated track laying means sustained by the forward one of the track cars, and an automatically actuated means sustained by the rear traction car for picking up the track and conveying it overhead.

27. A traction mechanism of the character stated, which comprises the following elements in combination; an endless flexible track composed of sectional side tread rails, an intermediate sectional rack rail, said sectional rack rail members being pivotally joined for vertical and lateral flexure, a pair of traction cars movable on the track, means on the top of the said cars for sustaining the overhead track portion, the said means being pivotally mounted to turn in the horizontal plane, a propelling mechanism mounted on the cars for moving them forward, means sustained by the forward one of the cars for laying the track and a means sustained on the rear traction car for picking up the track and conveying it overhead, as set forth.

28. An apparatus of the character described, comprising an endless flexible track composed of side tread rails, an intermediate rack rail, traction cars movable on the said flexible track, each of said cars embodying a traction truck, a pair of longitudinally alining and centrally disposed drive cog gears 16—4, a pair of oppositely disposed balance wheels mounted on the truck frame, the wheel 16—4 being arranged to engage the rack rails of the flexible track, and a balance wheel for engaging the opposing rail to the track, the outermost vertical frames and the intermediate vertical frames 39 and 40 mounted on the track frame, means for bracing the several vertical frames laterally, a third drive cog wheel 50 mounted on the intermediate vertical frame that coöperates with the rack rails of the endless track, means for coöperatively connecting the aforesaid three drive cog wheels whereby to move them in unison, and means on the cars for propelling the said cars forward and simultaneously laying the track at the forward end and picking it up at the rack end, as set forth.

29. An apparatus of the character described, comprising an endless flexible track composed of side tread rails, an intermediate rack rail, traction cars movable on the said flexible track, each of said cars embodying a traction truck, a pair of longitudinally alining and centrally disposed drive cog gears 16—4, a pair of oppositely disposed balance wheels mounted on the truck frame, the wheel 16—4 being arranged to engage the rack rails of the flexible track and the balance wheel for engaging the opposing rail to the track, the outermost vertical frames and the intermediate vertical frames 39 and 40 mounted on the track frame, means for bracing the several vertical frames laterally, a third drive cog wheel 50 mounted on the intermediate vertical frame that coöperates with the rack rails of the endless track, means for coöperatively connecting the aforesaid three drive cog wheels whereby to move them in unison, the overhead side rollers 49 mounted on the top of each outer pair of vertical frame members for coöperating with the side tread rollers of the flexible track, and means on the cars for propelling the said cars forward and simultaneously laying the track at the forward end and picking it up at the other end, as set forth.

30. An apparatus of the character described comprising an endless flexible track, composed of side sectional tread rails and a sectional intermediate rack rail, a plurality of cars movable on the said track, each of said cars comprising a traction truck in which is embodied a horizontally disposed main frame, a pair of centrally disposed drive cog wheels 16—4 mounted on the said main frame for coöperating with the intermediate rack rail of the endless flexible track, side balance wheels mounted on the said main frame for coöperating with the side tread rails of the track, vertically disposed frame members being mounted on the horizontally disposed main frame of the track, said frame members being formed of upwardly extending curved sections, one pair of the vertical frame members 39—40 being secured on each side of the traction truck, another pair of vertical frame members secured intermediate the outer vertical frame members, a transverse brace rod 130 for bracing the plurality of vertical frame members together, a third drive cog wheel 50 mounted on the intermediate pair of vertical frame members and near their top to coöperate with the intermediate rack rail sections of the track, means for connecting the said third drive cog wheel 50 to the first mentioned drive cog wheel 16—4 whereby the several drive cog wheels will be caused to move in unison with the overhead side roller 49 carried on top of one pair of the vertical frame members secured on each side of the traction truck for coöperating with the tread rail members of the endless track, said side rollers 49 being arranged in two sets, one set on each side of the traction track, each set of said rollers 49 being composed of three members separated from each other by a distance substantially equal the length of the endless track sections, the drum wheels carried by the endless traction truck, means mounted on the drum wheels, and the said first mentioned pair of drive wheels 16—4 whereby the said drum wheels and said pair of drive wheels 16—4 are caused to coöperatively move in unison, as set forth.

31. An apparatus of the character stated comprising an endless flexible track composed of side rollers and an intermediate rack rail, the latter having side flanges, trac tion cars movable upon the said track, each of which comprises a truck which embodies a horizontally disposed main frame, a pair of centrally disposed drive cog wheels 10—4 mounted on the said main frame for coöperating with the rack rails of the track, balance wheels 3 mounted on the main frame for coöperating with the side rails of the track, vertically disposed frame members 39—40, said frame members including curved sections which extend parallel, one pair of the said vertical frame members 39 being secured on each side of the traction truck, and the pair of vertical frame members being disposed intermediate of the outside frame members, means for bracing the several frame members, a third drive cog wheel 50 having a double flange mounted on the intermediate set of vertical frame members near the top thereof for coöperating with the intermediate rack rails and the tread flanges forming a part thereof, means for connecting the third drive cog wheel 50 and the other drive cog wheel 10—4 whereby the several cog wheels will be moved in unison, overhead side rails 49 carried upon one pair of vertical frame members secured on each side of the truck main frame for coöperating with the side tread rails, all of the said side tread rails being arranged in two sets, one set on each side of the said traction truck, each set being composed of at least three rails, the said rails being separated from each other by a distance substantially equal the length of the endless track sections whereby to provide for turning the said overhead endless track sections to the right or left, all of the side rails of one set being located on the same vertical plane, a pair of sprocket wheels 15—15 on each side of the said first mentioned pair of drive cog wheels 10—4 mounted on the track main frame, the cog drum wheels 22 carried by the end traction truck, a pair of sprocket wheels 20—20 mounted on each side of each drum wheel, an endless drive chain 24 connecting said sprocket wheel 15 to the drive wheel of the said sprocket wheel 20 of the drum wheels, means for holding the said track against the said drum wheels and said overhead cog wheels, said means including auxiliary rod rails 28—29 carried under the flexible main track, and presser rollers 25—25 carried by said traction cars and the said drum wheels for engaging the said auxiliary rod rails 28—29 whereby to brace the said main track against the said drum wheel and over the said overhead cog wheel, substantially as shown and described.

32. In an apparatus of the character described, an endless track which includes side tread rails, the central rack and the auxiliary rod rails, a plurality of traction cars to run on the said track, said traction cars each comprising a traction truck in which is included a main frame composed of a plurality of longitudinal beams and a pair of connecting cross beams, three pairs of vertical frame members assembled and secured on each truck main frame, each of the said vertical frame members including curved sections, a semi-circular bar plate member 39 secured on the main frame, a pair of curved bar plate members 40 that extend parallel and converge at the top, which are secured above the said semi-circular bar plate member 39, a transverse brace rod that joins the said three pairs of vertical frame members, the cog wheels 10—20 and side balance wheels 30 mounted on the truck main frame, all being arranged substantially as shown and described.

33. In an apparatus of the character stated, an endless track which includes side tread rails, the rack and the auxiliary rod rails, the said side tread and rack rails being composed of pivotally connected sections, a plurality of traction cars to run on the said track, each of which comprises a traction truck in which is included a main frame composed of a plurality of longitudinal beams and a pair of connecting cross beams, three pairs of vertical frame members parallelly arranged and secured on each truck main frame, each vertical frame member being composed of curved sections including a semi-circular bar plate 39 secured at its ends on the main frame of the truck, a pair of curved bar plate members 40 that extend upwardly and converge at the top and are secured above the said semi-circular bar plate member 39, a transverse brace rod 130 that joins the three pairs of vertical frame members, a transverse shaft 23—5 having crank members journaled in bearings on the truck main frame, a drive cog wheel 10—20 centrally secured on the said transverse shaft 23—5, a third transverse shaft 51 having crank members journaled in bearings 52 on the top of some of the vertical frame members and an overhead drive cog wheel 50 centrally geared by the said third shaft 51, said centrally disposed drive cog wheel coöperating in unison with the said rack rails, as set forth.

34. In an apparatus of the character described, an endless track which includes tread members, central rack portions and auxiliary rod rails, a plurality of traction cars for engaging and running on the said track, said traction cars each comprising a truck embodying a main frame composed of a plurality of longitudinal beams, three pairs of vertical frame members parallelly assembled, said members being fixedly secured to the main frame of the truck, each of the vertical frame members embodying curved sections and including a semi-circular bar plate 39 secured at its ends to the main frame of the truck, a pair of curved bar plates 140 that extend upwardly and converge at the top, and which are secured above the said semi-circular bar plate member 39, a transverse brace rod 30 for joining the several vertical frames, a pair of transverse shafts 23—5 having crank members and journaled on the truck main frame, a drive cog wheel 10—4 centrally secured on the tarnsverse shafts 23—5, sprocket wheels 15 mounted on the shaft 23—5, one sprocket wheel being on each side of the drive wheel 10, the third transverse shaft crank member 51 having crank members and journaled in bearings 52 secured on the top of some of the vertical frame members, an overhead drive cog wheel 50 carried by the said third shaft 51, the centrally disposed drive wheels coöperating in unison with the said rack rails, the lever bars 42 fulcrumed between some of the semi-circular bar plate members 39 and assembled in pairs, the pitman rods 43—45 that connect the said bars 42 with the said shaft cranks, and the power cylinder 46 carried by some of the vertical frame members between the curved bar plate members 40, said power cylinders including a piston rod coöperatively joined with the said lever bars 42, as set forth.

35. In an apparatus of the character described, an endless track which includes side tread rails, central rack, and auxiliary rod rails 28—29, a plurality of cars to run on said track, each of the said cars comprising a traction truck in which is embodied a main frame composed of a plurality of longitudinal beams and cross beams connected therewith, three pairs of vertical frame members parallelly assembled and secured to the truck main frame, each of said vertical members being composed of curved sections and including semi-circular bar plate members 39 made fast to the truck main frame, a pair of curved bar plate members 40 that extend upwardly and converge at the top and are secured to the said semi-circular member 39, a brace rod 130 that joins the three pairs of vertical frame members, a pair of transverse shafts 23—5 having crank members journaled on the truck main frame, a drive cog wheel 10—4 centrally secured to the said pair of transverse shafts 23—5, the sprocket wheels 15—15 mounted on the said transverse shafts 23—5, one of the sprocket wheels 15 mounted on each side of the drive wheel 10, the third transverse shaft 51 having crank members journaled in the upper end of some of the vertical frame members, an overhead drive cog wheel 50 carried centrally by said third shaft 51, said centrally disposed drive cog wheel coöperating with the centrally disposed rack rails on the endless track, lever bars 42 fulcrumed between some of the semi-circular members 39, the pitman rods 43—45 that connect the said lever bars with the said shaft cranks, the power cylinder 46 mounted on some of the vertical frame members, said cylinders each including a piston rod coöperatively joined with the lever bars 42, the side balance wheels 3 mounted on the said truck frame, the overhead side rails 49 mounted on the outer pairs of the vertical frame members, near their upper ends, the said balance wheels 3 and the overhead rails 49 being in the same vertical plane whereby to coöperate with the side tread rails of the endless track, cog drum wheels carried by the end cars, presser rails 25ᵈ that oppose the drive cog wheels 50, means for sustaining the said presser rails, consisting of the frame standards 41, a transverse tire rod 36 that con-
160 nects the said standards, the bars 19—19 that straddle the drum wheels, the spring bar 67, rails 25ᵃ—25ᵃ mounted on the said spring bar and means for suspending the said rod 19 and the rails for coöperating with the endless track and the drum wheel, as set forth.

36. In an apparatus of the character described, an endless track which includes Y-shaped rails, side bridges 137 that coöperate with the tread rails, intermediate racks having adjacent bearing flanges 35, and the auxiliary rod rails 28—29 in connection with a plurality of traction cars movable along the said track, said traction cars including two trucks coöperatively connected, one on the said truck being a traction truck and the other truck a trailer truck, adapted for carrying a motor and other accessories, said trailer truck engaging the main frame, the fifth wheel 98 mounted on the said main frame, a box car frame mounted on the fifth wheel 98, a horizontally disposed rectangular frame 57 mounted on the top of the box car, a plurality of shafts 66 rotatably mounted on the rectangular frame 57, a plurality of side rails 58 secured to the said shafts 66 for coöperating with the Y-shaped tread rails, said rails having outside flanges for coöperating with the bridge members 137, a plurality of centrally located cog rails 59 having double flanges mounted on the shafts 66 for coöperating with the intermediate rack rails and the adjacent bearing flanges thereof, a fifth wheel 63 centrally mounted on the horizontally disposed frame 57, and opposite the fifth wheel 98 of the trailer truck, a standard 65 mounted on the top of the box car, a vertical pivot for the securing the fifth wheel 63 of the said standard 65, and a gear segment 120 carried in front of the said horizontally disposed rectangular frame member 57, for the purposes described.

37. In an apparatus of the character described, an endless track including Y-shaped tread rails, side bridge members 137 coöperating with the said Y-shaped tread rails, an intermediate rack having adjacent bearing flanges and auxiliary rod rails 28—29; of a plurality of traction cars movable along the said truck, each of the said cars including two trucks coöperatively connected, one of the said trucks serving as a traction truck, the other as a trailer for carrying the motor and other accessories, the said trailer truck embodying a main frame, a fifth wheel 98 mounted on the said main frame, a section of a box car mounted on the said fifth wheel 98, horizontally disposed frames 57 mounted on the top of the box car, a plurality of shafts 66 rotatably mounted in the said frame 57, a pair of side rails 58 secured to the shaft 68 for coöperating with the Y-shaped tread rails, said rails 58 having side flanges for engaging with the bridge members 137, a plurality of central rack cog wheels 59 having double flanges mounted on the shafts 67 for coöperating with the intermediate track racks and the adjacent bearing flanges thereof, the fifth wheel 63 centrally mounted on the frame 57, and disposed oppositely to the fifth wheel 98 on the trailer track, a standard 65 on the top of the box car, a vertical pivot member for securing the fifth wheel 63 to the standard 65, a segmental gear wheel 120 mounted in front of the horizontally disposed frame 57, a pair of directing wheels 108 having double flanges mounted on the frame 57 for coöperating with the track and its adjacent bearing flanges for directing the truck on the said track, two pairs of side wheels 104 each having an outer flange mounted on the frame 57 for coöperating with the Y-shaped tread rails, a gear segment 115 carried in front of the trailer truck, means carried by the trailer truck for coöperatively connecting the overhead frame member 57 to the trailer truck whereby to move the said trailer truck and the overhead member 57 in unison, the said means including a segmental gear wheel 116 for engaging with the segmental gear wheel 115, the vertical rod 117 which carries the gear 116 at the lower end, a segmental gear 118 secured to the other end of the said rod, all being arranged substantially as shown and described.

38. In an apparatus of the character stated, an endless track composed of a plurality of sections flexibly connected with one another and each of which includes a supporting frame member, a centrally disposed rack rail mounted on the said frame member, tread rail links on each side of the supporting frame, a transverse bar 82 carried by the supporting frame, said bar 82 connecting the opposite tread rail links assembled by pairs, said tread rail links being Y-shaped and elongated slots in the bifurcated or Y-shaped branches of the said tread rail links, a transverse rod jointer 80 movable in the said slots, a pair of sectional traction feet connected with the supporting member, the sectional traction foot connecting with the outer branch of each Y-shaped portion of the tread rail portion, the transverse bar 95, the sectional traction foot secured to each of its extremities and means for connecting the several sections on the track together.

39. In an apparatus of the character stated, an endless track composed of a plurality of sections flexibly connected with one another, each of which includes a supporting frame member, a centrally disposed rack rail mounted on the supporting member, tread rail links on each side of said supporting member, one of the links being on each side, a transverse bar 82 carried by the supporting frame and connecting the opposite tread rail links assembled in pairs, said tread rail links having its Y-shaped portions provided with elongated slots, a transverse jointer rod 80 that takes in the side slots, one end of one Y shaped tread rail link being pivotally connected with the adjacent track section and pivotally secured to the rod jointer extremities, the aforesaid supporting frame being provided with means for holding a pair of sectional traction feet at its free end extremities, the sectional traction foot secured to the outer branch of each Y shaped tread rail link, a transverse tread bar 95 provided with a sectional traction foot at each of its extremities, traction feet carried by the bar 95 connected on the opposite traction feet mounted on the supporting frame member and on the outer end of the Y-shaped rail link, the horizontally disposed pivot holder 85, the vertical pivot member mounted centrally on said supporting frame member to connect each of the track sections and means for moving the auxiliary rod rail links under the supporting frame members, a plurality of traction cars connected with one another movable in unison on said track and the cog polygonal drum wheels carried by the cars for laying down and picking up the track, substantially as shown and described.

40. In an apparatus of the character described, an endless track composed of series of sections flexibly connected with each other, each section including a supporting frame member, composed of a pair of rectangular shaped longitudinally extending converging bars 70—71, a transverse main bar 80 provided at its extremities with apertures 81, the said rectangular shaped converging bars extending through the apertures of the transverse main bar 80, said transverse main bar being situated back of the free end extremities of the said converging bars.

41. In an apparatus of the character stated, an endless track including a series of sections flexibly connected with one another, said sections each including a supporting main frame composed of a pair of rectangular shaped longitudinally extending converging bars 70—71, a transverse main bar 80 having apertures 81 at its extremities, the converging bars 70—71 passing through the said apertures in the bar 80, said transverse main bar being situated back of the front end extremities of the converging bars, the transverse bar 82 secured to the transverse main bar 80 under which the main bar 80 passes, the said under transverse bar 82 extending across the rack rail to engage its sides, for the purposes described.

42. In an apparatus of the character described, an endless track which includes a series of flexibly connected sections, each section being composed of frame members formed of converging bars 70—71, a transverse main bar 80 having apertures 81—81 at the extremities through which the bars 70—71 pass, the said transverse bar 80 being situated in advance of the free end extremities of the converging bars, a transverse bar 82 secured under the main transverse bar 80, the said under transverse bar extending across the rail track for engaging with the sides thereof, a third and bi-forked bar secured to the main transverse bar 80, said bi-forked bar having branches 70—70 secured to the free end extremities of the converging bar, as set forth.

43. In an apparatus of the character described, an endless track which comprises a series of flexibly connected sections, each of which is composed of a pair of longitudinally extending converging bars 70—71, a main transverse bar 80 having apertures 81—81 for the passage of the bars 70—71, said main transverse bar being positioned in advance of the free end extremities of the converging bars 70—71, a transverse bar 82 disposed under the main bar and extending across the rail track and engaging the sides thereof, a third and bi-forked bar secured to the main transverse bar by their respective centers, the bi-forked bar having branches 79—79 secured to the free end and separate extremities of the converging bars, a pair of hangers 34—34, each having bearings on the top and mounted between the transverse bar 80, a bi-forked bar on the converging bar, and traction feet mounted on the supporting frame members, substantially as shown and described.

44. In an apparatus of the character described, an endless track which includes a series of sections flexibly connected with one another, each of said sections embodying a supporting frame member, composed of a pair of longitudinally extending converging bars, an apertured main transverse bar, said transverse bar being situated in advance of the free and separate end extremities of the converging bars, another transverse bar 82 secured under the main transverse bar and extending across the rail track to engage its sides, a bi-forked bar 77 secured to the transverse main bar at the separate free end extremities of the converging bars, the hangers 34—34, a sectional traction foot 73 mounted at the converging ends of each of the bars 70—71, a foot member 74 mounted on the ends of each of the branches 79—79 of the bi-forked member, said traction foot member 73 comprising a central portion 76, the central portion 76 having apertures, a semi-circular bar plate, another foot member comprising a central portion 76 having apertures and the semi-circular bar plate at right angles thereto, the several foot members 73 and 74 being riveted upon each other, a collar 72 at the converging ends of the converging bars, a centrally disposed rack rail mounted in said supporting frame, side tread rail links on each side of the said supporting frame, a pivot holder connecting said supporting frame sections and the auxiliary rod rails mounted under the said supporting frame, substantially as shown and described.

45. An apparatus of the character described which includes an endless track and traction cars adapted to run thereon, said track comprising a series of sections flexibly connected with each other, said sections including a supporting frame composed of a pair of converging bars, an apertured transverse main bar and an under bar secured to said converging bar, a bi-forked main bar secured on the transverse main bar by their respective centers, foot members at separate ends of each of said converging bars and the said bi-forked bar secured together, a pair of bearings 34 mounted between the transverse main bar and the bi-forked bar branches, a rack rail link 27 mounted on said supporting frame, said rack rail link being made up of a rack body provided with teeth on the top, a pair of rail bearings 35 adjacent said rack teeth, two branch members situated one above another at one end of said rack rail, the upper branch of which includes a small strip of the rack body and its teeth, and the adjacent rail bearings 35 between the prolongation of the two branches, the second branch being a prolongation of the rack rail body, the appended bar disposed vertically and joined to the other end of the said rack rail, said consecutive rack rail links being separated by racks 33.

46. An apparatus of the character described which includes an endless track and traction cars adapted to run thereon, said track comprising a series of sections flexibly connected with each other, said sections including a supporting frame composed of a pair of converging bars, an apertured transverse main bar and an under bar secured to said converging bar, a bi-forked main bar secured on the transverse main bar by their respective centers, foot members at separate ends of each of said converging bars and the said bi-forked bar secured together, a pair of bearings 34 mounted between the transverse main bar and the bi-forked bar branches, a rack rail link 27 mounted on said supporting frame, said rack rail link being made of a rack body provided with teeth on the top, a pair of rail bearings 35 adjacent said rack teeth, two branch members situated one above the other at one end of said rack rail, the upper branch of which includes a small strip of the rack body and its teeth, and the adjacent rail bearings 35 between the prolongation of the two branches, the second branch being a prolongation of the rack rail body, the appended bar disposed vertically and joined to the other end of the said rack rail, said consecutive rack rail links being separated by racks 33, a collar 72 at the adjacent ends of the said converging bar, the said rack rail link being centrally disposed and secured at one end to the transverse main bar 80, the other end being secured in the collar 72 at the adjacent ends of the said converging bars, a pivot holder formed of a frame member consisting of the parts 85—86—87, the part 85 having a groove on its top and pivotal branches which form prolongations of the parts 85, the said pivot holder being mounted at the free end extremities of the rack rail link and adapted to engage the rack branch, the vertical pivot for securing the several parts together, and for joining one rack rail track section to the next adjacent track section, as set forth.

47. An apparatus of the character stated, which includes an endless track and traction cars to run thereon, said track comprising a series of sections flexibly connected to one another, each of the said sections including a supporting frame composed of a pair of converging bars, an apertured main bar transversely to the said pair of converging bars, the under transverse bar 82 extending across the said track and secured to the main bar a bi-forked third bar secured to the main bar, a pair of hangers carrying bearings on the top mounted between the said main bar and the bi-forked third bar, said hangers having slots 90 at the lower end, a transverse rod jointer 89 which extends across the track and passing through said slots 90, said rod jointer being in the nature of a rod having a double crank shaft and an axial member 134 concaved on the top and convexed below and secured near each end extremity of the said rod jointer.

48. An apparatus of the character stated, which includes an endless track and traction cars to run thereon, said track comprising a series of sections flexibly connected to one another, each of the said sections including a supporting frame composed of a pair of converging bars, an apertured main bar transversely to the said pair of converging bars, the under transverse bar 82 extending across the said track and secured to the main bar a bi-forked third bar secured to the main bar, a pair of hangers carrying bearings on the top, mounted between the said main bar and the bi-forked third bar, said hangers having slots 90 at the lower end, a transverse rod jointer 89 which extends across the track and passing through said slots 90, said rod jointer being in the nature of a rod having a double crank shaft and an axial member 134 concaved on the top and convexed below and secured near each end extremity of the said rod jointer, a foot member 73 having an apertured prop 76 carried at the separate end of each pair of converging bars, a bi-valved foot member 74 having an apertured prop 76 secured at the separate ends of the said bi-forked third bar, a pair of transverse bar members 99, a sectional foot member at each end of the said transverse bar, a plurality of tenons fixedly secured to the side flexible members of the foot members, each transverse bar 95 being joined by the sectional foot member of the foot members carried by the converging bars, the tenons of one set of foot members engaging apertures of the other foot members, a pair of Y-shaped tread rails, the link or Y-shaped tread rails mounted on each side of the said supporting frame, means for coöperatively mounting the Y-shaped tread rails on the supporting frame, of the pair of bearings carried on the top of the hangers the rack rail mounted on said supporting frame, pivot holder carried by the free extremity of the said rack rail and the auxiliary rod rail under the main track, substantially as shown and described.

49. In an apparatus of the class stated, an endless track which includes a plurality of sections flexibly connected to one another, each of the said sections being composed of supporting frame embodying a pair of converging bars having foot members at their separate ends, an apertured main bar in which the converging bars are mounted, the under bar 82 which extends across the track sections and secured to the main bar, a bi-forked third bar which carries foot members at the free extremities, the said bi-forked third bar being joined to the main bar, a pair of hangers mounted between said bi-forked bar and main bars, said hangers having bottom slots 91, a pair of apertured tread rails, a link or Y-shaped tread rail mounted on each side of the supporting frame, said Y-shaped tread rail members including mono rail 93 having two branches 91—92, the latter being an inside branch, disposed parallelly and forming side way, joined to the main mono rail side member, the said inside branch near the middle of its length being bent at an angle toward the outside, the mono rail surface and the inside branch surfaces being on the same plane whereby to coöperate with the balance wheels of the cars, the outside of the mono rail branch being straight and being provided with an angular plate 94 at its junction with the mono rail side, the surface of the outside branch 91 and its angular plate 94 being on the same plane and below the surface of the mono rail and its inside branch, the inside branch of the mono rail 92 having a slot 97, the outside branch having a slot way 97', a sectional foot member under the extremities of the said outside branch 91, the said sectional foot member 96 being made up of semi-circular prolongations of the outside branch 91, and the central prop or member 70 having a plurality of apertures, the inside branch 92 being provided under its free end extremities with an aperture 136, the side bridge members 137 carried sidewise by the free end extremities of the mono rail 93, said bridges 137 being arranged to coöperate with the angular plate 94 of the next tread rail sections, and means for mounting the said tread rail link Y-shaped portions on each side of the supporting frame.

50. An apparatus of the character described, an endless flexible track comprising a series of central rack portions pivotally joined to each other and each having lateral smooth tread portions, a pair of oppositely disposed side tread portions, each of said side tread portions consisting of Y-shaped members 91—92, the links 93, shoes carried by the extremities of the Y-shaped portions, the transverse bars that connect the side members with the central rack portion, the converging brace bars 70 joined at one end to the rack portion and carrying shoes at their extremities, said bars being supported between their ends upon the transverse bar 80, a supplemental converging bar secured to the transverse bar 80 and to the extremities of the bar 70 and having shoes at their extremities, and the bars 95 that join the extremities of the Y-shaped outer track rails, and the bars 70 substantially as shown and for the purposes described.

PHILIPPE MONTSABRE.

Witnesses:
MAGGIE HERTWECK,
INEZ D. YOUNG.